United States Patent
Uchiyama

(10) Patent No.: US 9,513,826 B2
(45) Date of Patent: Dec. 6, 2016

(54) STORAGE APPARATUS AND STORAGE APPARATUS CONTROL METHOD

(71) Applicant: FUJITSU LIMITED, Kawasaki-shi, Kanagawa (JP)

(72) Inventor: Kenji Uchiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/718,311

(22) Filed: May 21, 2015

(65) Prior Publication Data
US 2016/0048349 A1 Feb. 18, 2016

(30) Foreign Application Priority Data
Aug. 18, 2014 (JP) .................................. 2014-165996

(51) Int. Cl.
*G06F 12/00* (2006.01)
*G06F 3/06* (2006.01)

(52) U.S. Cl.
CPC ........... *G06F 3/0619* (2013.01); *G06F 3/0646* (2013.01); *G06F 3/0647* (2013.01); *G06F 3/0683* (2013.01); *G06F 3/0689* (2013.01)

(58) Field of Classification Search
CPC .... G06F 3/0619; G06F 3/0646; G06F 3/0647; G06F 3/0683; G06F 3/0689
See application file for complete search history.

(56) References Cited

U.S. PATENT DOCUMENTS

2002/0141296 A1  10/2002  Tezuka et al.
2008/0140730 A1  6/2008  Toshine

FOREIGN PATENT DOCUMENTS

| JP | 2002-297431 | 10/2002 |
|----|-------------|---------|
| JP | 2008-146408 | 6/2008 |
| JP | 2010-522914 | 7/2010 |
| WO | 2008/116751 A1 | 10/2008 |

*Primary Examiner* — Shawn X Gu
(74) *Attorney, Agent, or Firm* — Staas & Halsey LLP

(57) ABSTRACT

A storage apparatus, including a first group including first storage media storing data and a second group including second storage media storing no data, makes an area of the first storage media which stores updating target data an invalid area and to store updated data into an area of the first storage media, migrates to the second storage media data stored in an area other than the invalid areas of the set of the first storage media when determining that the first group includes the set of the first storage media in which the sum of the invalid areas is not less than the capacity of the one storage medium, and moves a group including the first storage media from which migration of the data is completed from the first group to the second group.

7 Claims, 22 Drawing Sheets

| PV IDENTIFIER | STORAGE LOCATION LIBRARY | JOINED PVG | STATUS | NUMBER OF STORED LVS | NUMBER OF VALID LVS | VALID LV RATE (%) |
|---|---|---|---|---|---|---|
| PV00 | LIB#0 | SCRATCH#00 | UNUSED | 0 | 0 | 0 |
| PV01 | LIB#0 | STACKED#0 | WRITING | 300 | 240 | 80 |
| PV02 | LIB#1 | STACKED#1 | USED | 0 | 0 | 0 |
| PV03 | LIB#1 | STACKED#1 | READING | 500 | 350 | 70 |
| PV04 | LIB#0 | STACKED#0 | ACCESS NOT ALLOWED | 200 | 180 | 90 |
| PV05 | LIB#0 | STACKED#0 | MEDIUM FAILURE | 100 | 50 | 50 |

| PVG IDENTIFIER | ASSOCIATED SCRATCH PVG IDENTIFIER | TAPE LIBRARY IDENTIFIER | NUMBER OF PVS | ABSOLUTE MIN | HARD MIN | SOFT MIN | VALID LV BASE RATE (%) |
|---|---|---|---|---|---|---|---|
| STACKED#0 | SCRATCH#00 | LIB#0 | 10 | 2 | 4 | 6 | 70 |
| STACKED#1 | SCRATCH#00 | LIB#0 | 10 | 2 | 4 | 6 | 70 |
| SCRATCH#00 | NONE | LIB#0 | 5 | 5 | 10 | 20 | 50 |
| SCRATCH#01 | NONE | LIB#0 | 20 | 2 | 4 | 6 | 70 |
| SCRATCH#02 | NONE | LIB#1 | 20 | 4 | 8 | 24 | 60 |
| STACKED#2 | SCRATCH#01 | LIB#0 | 5 | 4 | 8 | 24 | 60 |
| STACKED#3 | SCRATCH#01 | LIB#0 | 5 | 4 | 8 | 24 | 60 |

121

| PV IDENTIFIER | STORAGE LOCATION LIBRARY | JOINED PVG | STATUS | NUMBER OF STORED LVS | NUMBER OF VALID LVS | VALID LV RATE (%) |
|---|---|---|---|---|---|---|
| PV00 | LIB#0 | SCRATCH#00 | UNUSED | 0 | 0 | 0 |
| PV01 | LIB#0 | STACKED#0 | WRITING | 300 | 240 | 80 |
| PV02 | LIB#1 | STACKED#1 | USED | 0 | 0 | 0 |
| PV03 | LIB#1 | STACKED#1 | READING | 500 | 350 | 70 |
| PV04 | LIB#0 | STACKED#0 | ACCESS NOT ALLOWED | 200 | 180 | 90 |
| PV05 | LIB#0 | STACKED#0 | MEDIUM FAILURE | 100 | 50 | 50 |

FIG. 11

| PV IDENTIFIER | STORAGE LOCATION LIBRARY | JOINED PVG | STATUS | NUMBER OF STORED LVS | NUMBER OF VALID LVS | VALID LV RATE (%) |
|---|---|---|---|---|---|---|
| PV00 | LIB#0 | SCRATCH#00 | UNUSED | 0 | 0 | 0 |
| PV01 | LIB#0 | SCRATCH#00 | UNUSED | 0 | 0 | 0 |
| PV02 | LIB#0 | SCRATCH#00 | UNUSED | 0 | 0 | 0 |

122A

⬇

| PV IDENTIFIER | STORAGE LOCATION LIBRARY | JOINED PVG | STATUS | NUMBER OF STORED LVS | NUMBER OF VALID LVS | VALID LV RATE (%) |
|---|---|---|---|---|---|---|
| PV00 | LIB#0 | STACKED#0 | USED | 100 | 100 | 100 |
| PV01 | LIB#0 | SCRATCH#00 | UNUSED | 0 | 0 | 0 |
| PV02 | LIB#0 | SCRATCH#00 | UNUSED | 0 | 0 | 0 |

| PV IDENTIFIER | STORAGE LOCATION LIBRARY | JOINED PVG | STATUS | NUMBER OF STORED LVS | NUMBER OF VALID LVS | VALID LV RATE (%) |
|---|---|---|---|---|---|---|
| PV00 | LIB#0 | STACKED#0 | USED | 100 | 100 | 100 |
| PV01 | LIB#0 | SCRATCH#00 | UNUSED | 0 | 0 | 0 |
| PV02 | LIB#0 | SCRATCH#00 | UNUSED | 0 | 0 | 0 |

⇩

122D

| PV IDENTIFIER | STORAGE LOCATION LIBRARY | JOINED PVG | STATUS | NUMBER OF STORED LVS | NUMBER OF VALID LVS | VALID LV RATE (%) |
|---|---|---|---|---|---|---|
| PV00 | LIB#0 | STACKED#0 | USED | 100 | 0 | 0 |
| PV01 | LIB#0 | SCRATCH#00 | UNUSED | 0 | 0 | 0 |
| PV02 | LIB#0 | SCRATCH#00 | UNUSED | 0 | 0 | 0 |

⇩

122E

| PV IDENTIFIER | STORAGE LOCATION LIBRARY | JOINED PVG | STATUS | NUMBER OF STORED LVS | NUMBER OF VALID LVS | VALID LV RATE (%) |
|---|---|---|---|---|---|---|
| PV00 | LIB#0 | SCRATCH#00 | UNUSED | 100 | 0 | 0 |
| PV01 | LIB#0 | SCRATCH#00 | UNUSED | 0 | 0 | 0 |
| PV02 | LIB#0 | SCRATCH#00 | UNUSED | 0 | 0 | 0 |

| PV IDENTIFIER | STORAGE LOCATION LIBRARY | JOINED PVG | STATUS | NUMBER OF STORED LVS | NUMBER OF VALID LVS | VALID LV RATE (%) |
|---|---|---|---|---|---|---|
| 22A | LIB#0 | STACKED#0 | USED | 30 | 20 | 66 |
| 22B | LIB#0 | STACKED#0 | USED | 30 | 10 | 33 |
| 22C | LIB#0 | STACKED#0 | USED | 40 | 30 | 75 |
| 22D | LIB#0 | SCRATCH#1 | UNUSED | 0 | 0 | 0 |
| 22E | LIB#0 | SCRATCH#1 | UNUSED | 0 | 0 | 0 |
| ... | ... | ... | ... | ... | ... | ... |

122K

| PV IDENTIFIER | STORAGE LOCATION LIBRARY | JOINED PVG | STATUS | NUMBER OF STORED LVS | NUMBER OF VALID LVS | VALID LV RATE (%) |
|---|---|---|---|---|---|---|
| 22A | LIB#0 | STACKED#0 | USED | 30 | 0 | 0 |
| 22B | LIB#0 | STACKED#0 | USED | 30 | 0 | 0 |
| 22C | LIB#0 | STACKED#0 | USED | 40 | 0 | 0 |
| 22D | LIB#0 | STACKED#0 | USED | 40 | 40 | 100 |
| 22E | LIB#0 | STACKED#0 | USED | 20 | 20 | 100 |
| ... | ... | ... | ... | ... | ... | ... |

122L

| PV IDENTIFIER | STORAGE LOCATION LIBRARY | JOINED PVG | STATUS | NUMBER OF STORED LVS | NUMBER OF VALID LVS | VALID LV RATE (%) |
|---|---|---|---|---|---|---|
| 22A | LIB#0 | SCRATCH#1 | UNUSED | 30 | 0 | 0 |
| 22B | LIB#0 | SCRATCH#1 | UNUSED | 30 | 0 | 0 |
| 22C | LIB#0 | SCRATCH#1 | UNUSED | 40 | 0 | 0 |
| 22D | LIB#0 | STACKED#0 | USED | 40 | 40 | 100 |
| 22E | LIB#0 | STACKED#0 | USED | 20 | 20 | 100 |
| ... | ... | ... | ... | ... | ... | ... |

STORAGE APPARATUS AND STORAGE APPARATUS CONTROL METHOD

CROSS-REFERENCE TO RELATED APPLICATION

This application is based upon and claims the benefit of priority of the prior Japanese Patent Application No. 2014-165996, filed on Aug. 18, 2014, the entire contents of which are incorporated herein by reference.

FIELD

The embodiments discussed herein are related to a storage apparatus and a storage apparatus control method.

BACKGROUND

A tape library device (LIB: Library) that includes multiple storage media using magnetic tapes has been used in a wide variety of applications in which mass storage is desired for data backup to a host such as a server, or for other purposes. On the one hand, a magnetic tape has an advantage of being low-cost and having large storage capacity, but on the other hand the magnetic tape allows slower data access speed than a hard disk drive (HDD) or the like. For this reason, in recent years, there has been used a hierarchical storage system in which a disk array device including multiple HDDs is used as a cache mechanism (primary storage), and a tape library device of larger capacity is provided in a back-end (secondary storage). In some cases, the hierarchical storage system may be referred to as a virtual tape library. In addition, a disk array device may be referred to as a tape volume cache (TVC), and a tape medium may be referred to as a physical volume (PV).

Such a hierarchical storage system has a hierarchy control server configured to control a disk array device or a tape library device. For example, when there is a data read or write request from a host, the hierarchy control server behaves to the host as a conventional tape library device, but internally performs reading and writing of data by using the disk array device. In this process, the hierarchy control server performs reading and writing on the disk array device by treating, as one logical volume (LV), a set of data acquired from each host. Then, in the background, the hierarchy control server saves the data written to the disk array device in a tape medium without having an intervention by the host. Specifically, the hierarchy control server saves the logical volume stored in the disk array device into a physical volume, namely, a tape medium. This process to store a logical volume in the disk array device into a physical volume may be referred to as "migration" in some cases.

In order to relieve a situation where the capacity of the disk array device is largely occupied by physical volumes stored therein, the hierarchical storage system erases large-capacity physical volumes that have not been updated and have been already migrated.

In addition, the hierarchical storage system has a technique to generate and manage a group called Stacked PVG (physical volume group) from used physical volumes in which logical volumes are already stored. The hierarchical storage system further has a technique to generate and manage a group named Scratch PVG from unused physical volumes in which no data is stored.

Here, operation of the hierarchical storage system in migration is described in detail. A state of a logical volume which is to be read and written by the host on the disk array device and which is already stored in the disk array device may be referred to as on cache. In addition, a state of a logical volume which is to be read and written by the host on the disk array device but is not yet stored in the disk array device may be referred to as cache miss. When a logical volume to be read and written by the host is on cache, the hierarchy control server reads the logical volume from the disk array device and responds to the host. In contrast to this, when the logical volume to be read and written by the host is a cache miss, the hierarchy control server inserts the physical volume, to which that logical volume has been migrated, into a tape drive of the tape library device, and reads that logical volume. Then, after moving the read logical volume to the disk array device, the hierarchy control server responds to the host.

The hierarchical storage system further performs updating of a logical volume in which a new logical volume of same data is stored in a physical volume by migration. In this respect, in order to save troublesome processing such as generation management or the like, an operation may be performed that with an old logical volume prior to updating as an invalid logical volume, an area of that invalid logical volume is made an invalid area. In this case, every time a logical volume is updated, an invalid area in a physical volume increases, thus reducing a usable area in the physical volume. Then, when a logical volume may no longer be stored in the physical volume, an unused physical volume is newly used. For example, when Stacked PVG and Scratch PVG are used, a physical volume to be used is moved from the Scratch PVG to the Stacked PVG if the Stacked PVG has no physical volume that may store a logical volume. Consequently, at last, the number of unused physical volumes is also reduced.

Thus, as a conventional technique to increase the number of unused physical volumes, there is a technique called reorganization as described below. In the reorganization, when the number of remaining unused physical volumes is small in the tape library device, logical volumes are moved from a used physical volume to an unused physical volume in order to increase the number of unused physical volumes. Then, the used physical volume from which stored logical volume has been moved becomes an unused physical volume. When the Stacked PVG and the Scratch PVG are used, unused physical volumes generated by the reorganization are returned to the Scratch PVG.

In addition, as a reorganization technique, there is a conventional technique to determine an area of invalid data from information on offset or length or the like related to stored data and move data. There is another conventional technique to execute reorganization in an optical library device. In addition, there is a conventional technique to select as a migration destination tape a tape which stores the most valid data corresponding to invalid data stored in a migration source tape, when data is migrated.

Related techniques are disclosed in, for example, Japanese National Publication of International Patent Application No. 2010-522914, Japanese Laid-open Patent Publication No. 2002-297431, and Japanese Laid-open Patent Publication No. 2008-146408.

However, it is possible in the conventional hierarchical storage system that there are not enough unused physical volumes in executing reorganization, thus making it difficult to reserve sufficient physical volumes in Scratch PVG. In such a case, a reorganization process is difficult to perform. Consequently, migration of logical volumes stored in a disk array device to physical volumes fails, thus making it difficult to maintain data redundancy in a virtual tape device.

In addition, when the conventional technique to determine an invalid data area from information related to stored data is used, it is difficult to avoid depletion of unused physical volumes although optimization of reorganization may be implemented. This is also true even when the conventional reorganization technique in an optical library device or the conventional technique to select a migration destination based on a relation with invalid data in a migration source is used.

SUMMARY

According to an aspect of the invention, a storage apparatus includes a plurality of storage media, a group management unit configured to manage a first group including first storage media storing data among the storage media and a second group including second storage media storing no data among the storage media, a data storage unit configured to make an area of the first storage media which stores update target data an invalid area and to store updated data into an area of the first storage media, a determination unit configured to determine whether or not the first group includes a set of the first storage media in which a sum of the invalid areas is equal to or larger than capacity of one of the storage media, a data migration unit configured to migrate to the second storage media data stored in an area other than the invalid areas of the set of the first storage media, when the determination unit determines that the first group includes the set of the first storage media in which the sum of the invalid areas is equal to or larger than the capacity of the one storage medium, and a movement unit configured to move a group including the first storage media from which migration of the data by the data migration unit is completed from the first group to the second group.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a view of an example of a PVG management table;

FIG. 11 is a view of an example illustrating transition in a PV management table when migration is executed;

FIG. 12 is a view of an example illustrating transition in a PV management table when a logical volume is deleted;

FIG. 18 is a view illustrating transition in the PV management table when the advance reorganization illustrated in FIG. 14 to FIG. 17 is executed;

DESCRIPTION OF EMBODIMENTS

Hereinafter, an embodiment according to the present storage apparatus and a storage apparatus control method will described in detail with reference to the accompanying drawings.

Figure 1:
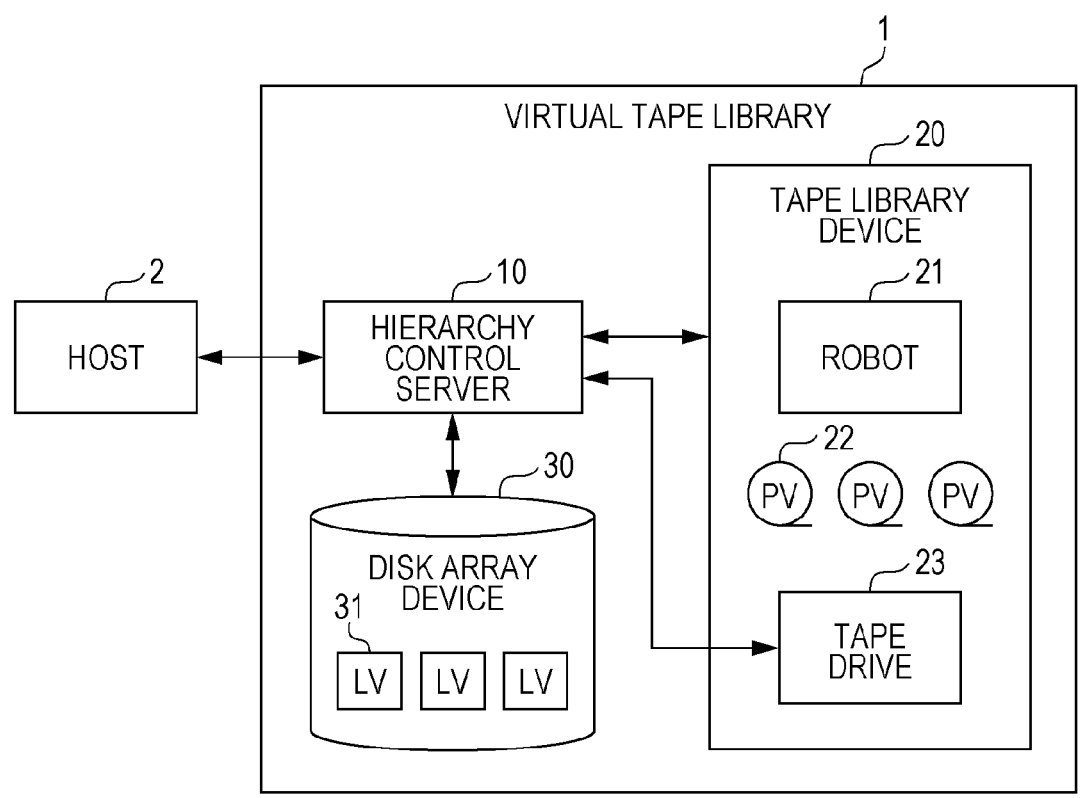
FIG. 1 is a block diagram of a storage system according to an embodiment.

FIG. 1 is a block diagram of a storage system according to an example. As illustrated in FIG. 1, in the storage system according to the embodiment, a virtual tape library 1 is connected to a host 2. The host 2 is an information processor such as a server. The virtual tape library 1 is one example of a "storage apparatus".

The virtual tape library 1 has a hierarchy control server 10, a tape library device 20, and a disk array device 30. Specifically, the hierarchy control server 10 is connected to the host 2. The hierarchy control server 10 is also connected to the tape library device 20 and the disk array device 30.

The disk array device 30 has a storage medium having higher reading and writing speed than a mass-storage apparatus such as a tape. For example, the disk array device 30 has a hard disk or the like. Then, the disk array device 30 stores a logical volume (LV) in a storage medium that the disk array device 30 has. The disk array device 30 is one example of a "storage device".

The tape library device 20 has a robot 21, a physical volume (PV) 22, and a tape drive 23. The physical volume 22 is a mass storage medium which is, for example, a magnetic tape. The tape library device 20 has a plurality of physical volumes 22.

The robot 21 carries the physical volume 22. For example, upon receipt of an instruction to write or read from the hierarchy control server 10, the robot 21 inserts a specified physical volume 22 into the tape drive 23. Then, when a process to write to or read from the physical volume 22 by the tape drive 23 ends, the tape drive 23 retrieves the physical volume 22 from the tape drive 23 and returns the physical volume 22 to a storage location.

Following an instruction from the hierarchy control server 10, the tape drive 23 performs writing or reading of data to or from the inserted physical volume 22.

Figure 2:
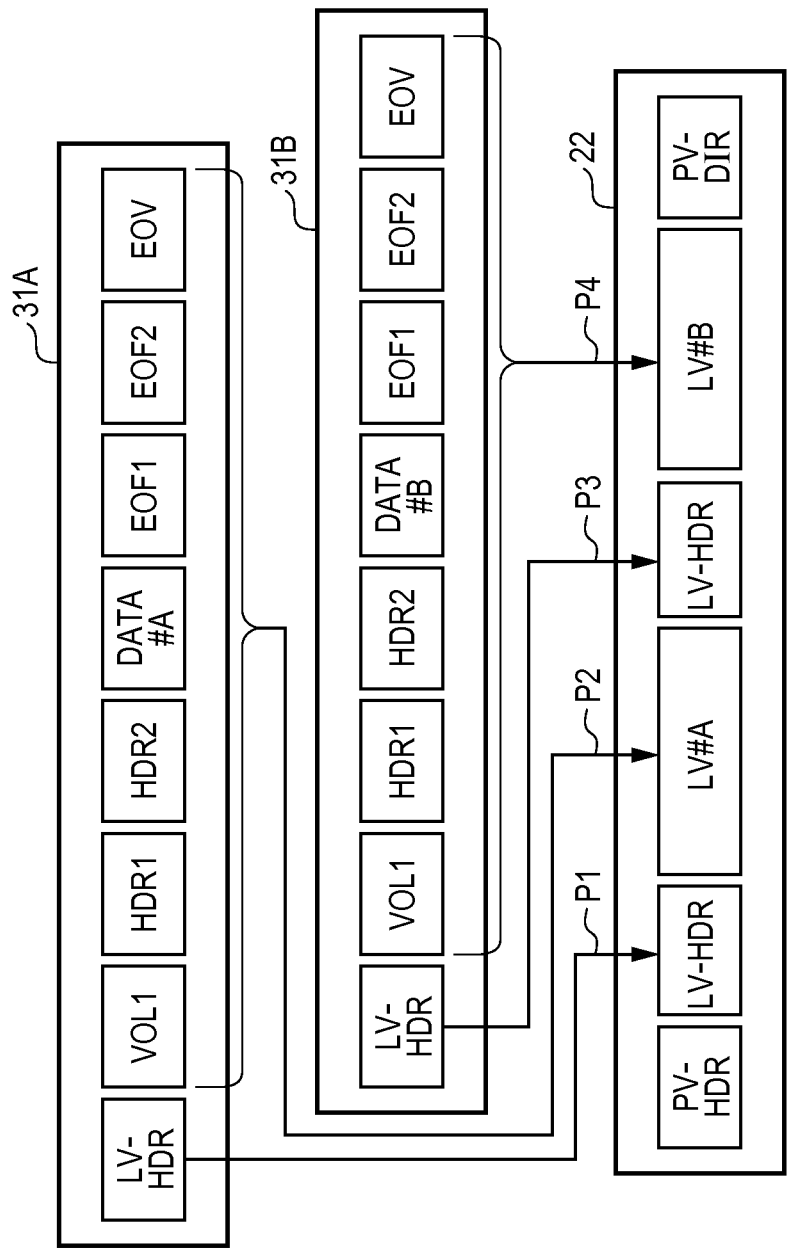
FIG. 2 is a conceptual diagram illustrating a format of a physical volume.

Now, a format of a physical volume 22 is described. FIG. 2 is a conceptual diagram illustrating a format of a physical volume. Here, a description is given with a case in which logical volumes 31A and 31B are stored in the physical volume 22. Suppose that the logical volume 31A is first stored and then the logical volume 31B is stored.

The logical volume 31A has a logical volume header (LV-HDR (Header)), volume (VOL) 1, HDR1, HDR2, DATA #A, end of file (EOF) 1, end of file (EOF) 2, and end of volume (EOV). The logical volume 31B also has a similar format for information other than DATA#B which is replaced by DATA#A. A LV-HDR block is a block into which a generation indicating the number of updates of the logical volume 31, a logical volume name, a logical volume group name, logical volume size, and a date of logical volume creation are stored. A VOL1 block is an 80-byte block in which information on a volume name, an owner, or the like is stored. An HDR1 block is an 80-byte block in which a file name, a date of updating, or the like are stored. An HDR2 block is an 80-byte block in which a record format, block length, or the like are stored. A block of DATA#A and DATA#B is a block of variable length in which user data is stored. An EOF1 block is an 80-byte block in which a file name, a date of updating, or the like is stored. An EOV block is a mark block indicating end of a volume.

Then, PV-HDR is stored at a head of a physical volume 22. In the PV-HDR, a standard identifier, a physical volume name, and a group name of a group to which a physical volume 22 belongs are stored. In addition, an identifier of a virtual tape library device and status of the physical volume 22 are stored in the PV-HDR. A group of physical volumes 22 is described below in detail. Following the PV-HDR, LV-HDR of the logical volume 31A which is first stored is stored, as depicted by an arrow P1. Then, as depicted by an arrow P2, VOL1, HDR1, HDR2, DATA#A, EOF1, EOF2, and EOV of the logical volume 31A are stored as LV#A which is data of one logical volume. Then, as depicted by an arrow P3, LV-HDR of the logical volume 31B which is stored secondly is stored. Then, as depicted by an arrow P4, VOL1, HDR1, HDR2, DATA#B, EOF1, EOF2, and EOV of the logical volume 31B are stored as LV#B which is data of one logical volume. Lastly, PV-DIR (Directory) is stored in the physical volume 22. In the PV-DIR, information indicating a list or end of physical volumes, or the like is stored. As such, the logical volumes 31 are stored in the physical volume 22 so that the logical volumes 31 are sequentially connected to the end in the order of writing.

Referring back to FIG. 1, a description is continued. The hierarchy control server 10 receives an instruction to write data from the host 2. When receiving the instruction to write data, the hierarchy control server 10 writes a specified data group as one logical volume 31 to the disk array device 30. Then, the hierarchy control server 10 sends back a response to the host 2. Afterward, the hierarchy control server 10 executes migration. Specifically, the hierarchy control server 10 reads the logical volume 31 stored in the disk array device 30, instructs the tape library device 20 to write the read data to the physical volume 22, and causes the physical volume 22 to store the data.

In addition, when receiving an instruction to read data, the hierarchy control server 10 determines whether or not there is a logical volume 31 storing data to be read in the disk array device 30. When there is a logical volume 31 storing the data to be read in the disk array device 30, the hierarchy control server 10 reads the logical volume 31 from the disk array device 30. Then, the hierarchy control server 10 returns the read data to the host 2.

When there is no logical volume 31 storing the data to be read in the disk array device 30, the hierarchy control server 10 instructs the tape library device 20 to read the logical volume 31, causes the tape library device 20 to read the logical volume 31 from the physical volume 22, and acquires the read logical volume 31. Then, the hierarchy control server 10 returns the data stored in the acquired logical volume 31 to the host 2 and further stores the acquired logical volume 31 in the disk array device 30.

In addition, when receiving an instruction to delete data from the host 2, the hierarchy control server 10 deletes a logical volume 31 stored in the disk array device 30 or the physical volume 22.

Furthermore, when invalid areas in which invalid logical volumes 31 of the physical volume 22 are stored increase, the hierarchy control server 10 executes reorganization wherein usable areas are increased by moving valid areas in which valid logical volumes 31 are stored to other physical volume 22 and integrating the valid areas. Now, the logical volume 31 being valid is a case in which a logical volume 31 updated to that logical volume 31 is not stored or a case in which that logical volume 31 is not deleted.

In addition, as reorganization, the hierarchy control server 10 executes reorganization when the sum of invalid areas and unused areas is equal to or larger than the capacity of one physical volume 22. Here, reorganization to be executed when the sum of invalid areas and unused areas is equal to or larger than the capacity of one physical volume 22 is referred to as "advance reorganization". In addition, here, reorganization other than advance reorganization may be referred to as "normal reorganization".

Figure 3:
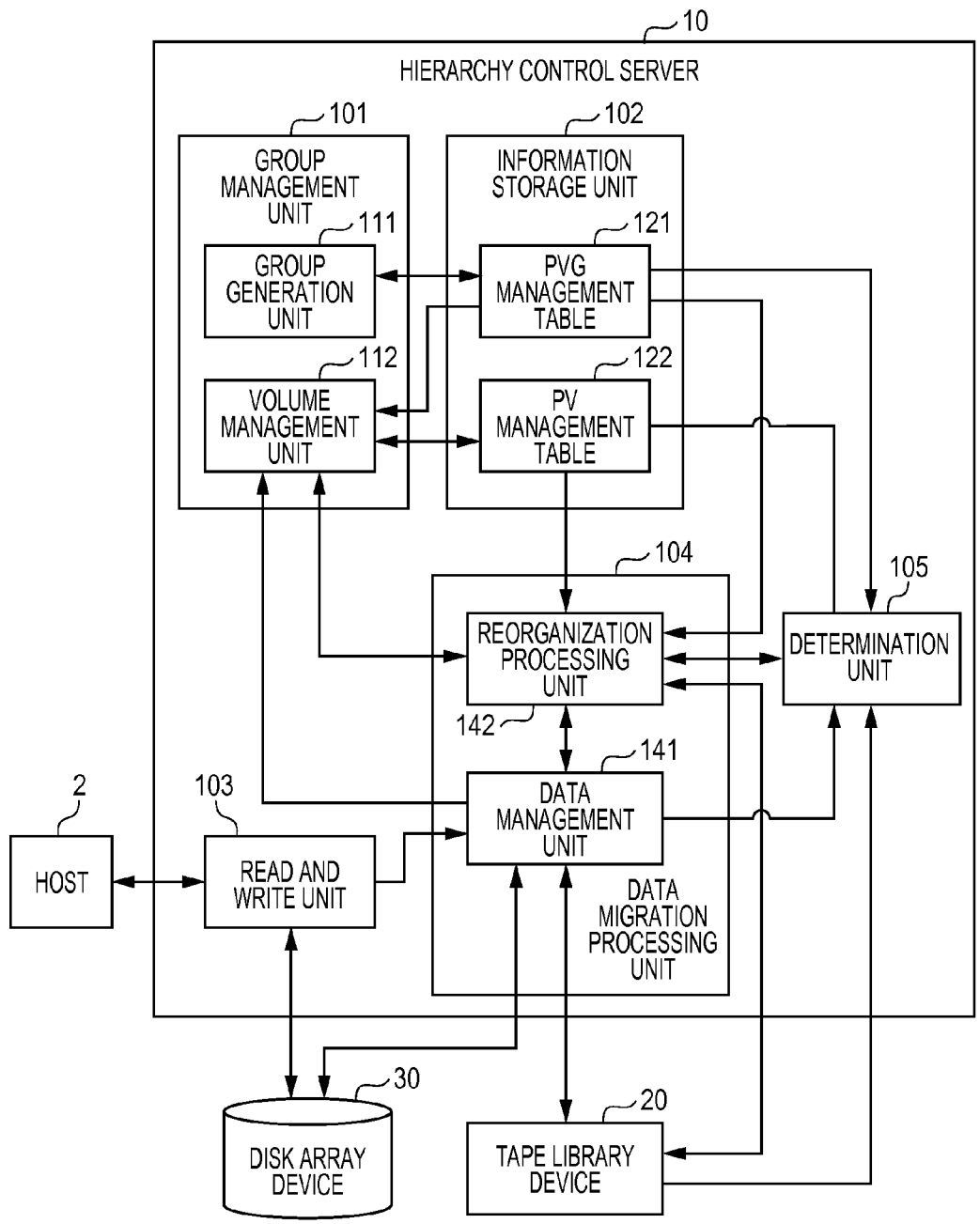
FIG. 3 is a block diagram of a hierarchy control server.

In addition, details of the hierarchy control server 10 are described with reference to FIG. 3. FIG. 3 is a block diagram of a hierarchy control server. As illustrated in FIG. 3, the hierarchy control server has a group management unit 101, an information storage unit 102, a read and write unit 103, a data migration processing unit 104, and a determination unit 105.

The read and write unit 103 receives a data write command or a data read command from the host 2. In the case of a write command, the read and write unit 103 stores data as a logical volume 31 in the disk array device 30. Now, when the read and write unit 103 is instructed to generate a logical volume group by the host 2, the read and write unit 103 generates a logical volume group in the disk array device 30. Then, when a logical volume is specified as a data write location in the write command, the read and write unit 103 stores the logical volume 31 so that the logical volume 31 belongs to a logical volume group specified by the disk array device 30.

Then, the read and write unit 103 notifies the data migration processing unit 104 of the storage of the logical volume 31.

Furthermore, the read and write unit 103 receives a command to delete a logical volume 31 from the host 2. In this case, the read and write unit 103 deletes a specified logical volume 31 from the disk array device 30. In addition, the read and write unit 10 instructs the data migration processing unit 104 to delete the logical volume 31.

The group management unit 101 has a group generation unit 111 and a volume management unit 112.

The group generation unit 111 forms a group from used physical volumes 22 and forms a group from unused physical volumes 22 among physical volumes 22 included in the tape library device 20. Here, the used physical volumes 22 are physical volumes in which valid logical volumes 31 are already stored. In addition, the unused physical volumes 22 are physical volumes in which no valid logical volumes 31 are stored. A group of the used physical volumes 22 is hereinafter referred to as "Stacked PVG (physical volume group)". In addition, a group of the unused physical volumes 22 is referred to as "Scratch PVG".

The group generation unit 111 generates one or more Stacked PVG. The group generation unit 111 also creates one or more Scratch PVG.

Figure 4:
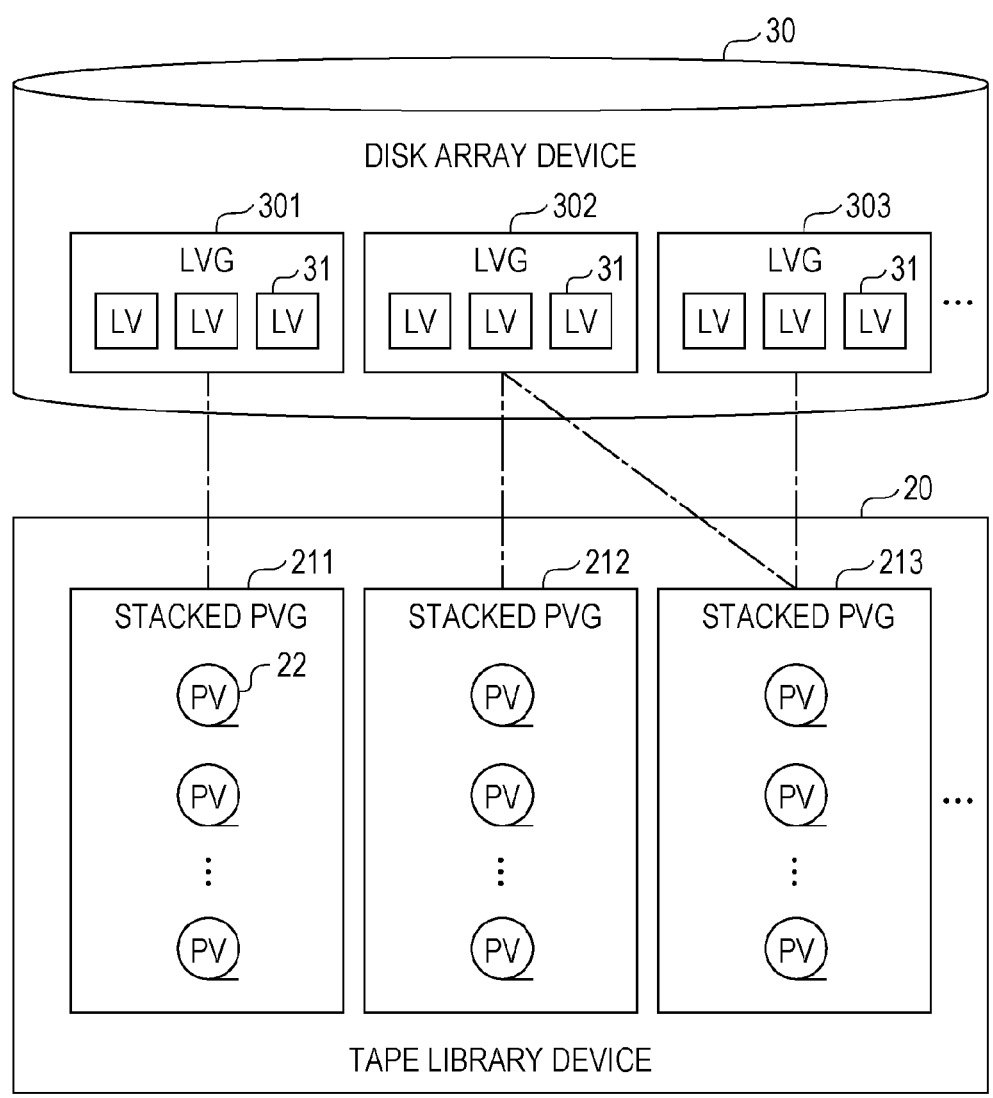
FIG. 4 is a view of an example of Stacked PVG.

FIG. 4 is a view of an example of Stacked PVG. For example, the disk array device 30 stores logical volume groups including logical volume groups (LVG) 301 to 303. Each of the logical volume groups 301 to 303 includes a plurality of logical groups 31.

The group generation unit 111 generates Stacked PVGs including Stacked PVGs 211 to 213. Each of the Stacked PVG 211 to 213 is hereinafter referred to as "Stacked PVG 210" if each of the Stacked PVGs is not distinguished. One or more physical volume 22 belong to one Stacked PVG 210. Then, the group generation unit 111 associates one or more Stacked PVGs 210 with the logical volume groups 301 to 303. In FIG. 4, a dashed-dotted line represents association of the logical volume groups 301 to 303 with the Stacked PVGs 211 to 213. The group generation unit 111 associates the Stacked PVG 211 with the logical volume group 301. The group generation unit 111 also associates the Stacked PVGs 212 and 213 with the logical volume group 302. The group generation unit 111 also associates the Stacked PVG 213 with the logical volume group 303. Among the logical volume groups and the Stacked PVGs thus associated, a process to store a logical volume 31 in a physical volume 22 or a process to read a logical volume 31 stored in a physical volume 22 and store the logical volume 31 in the disk array device 30 is performed.

Figure 5:
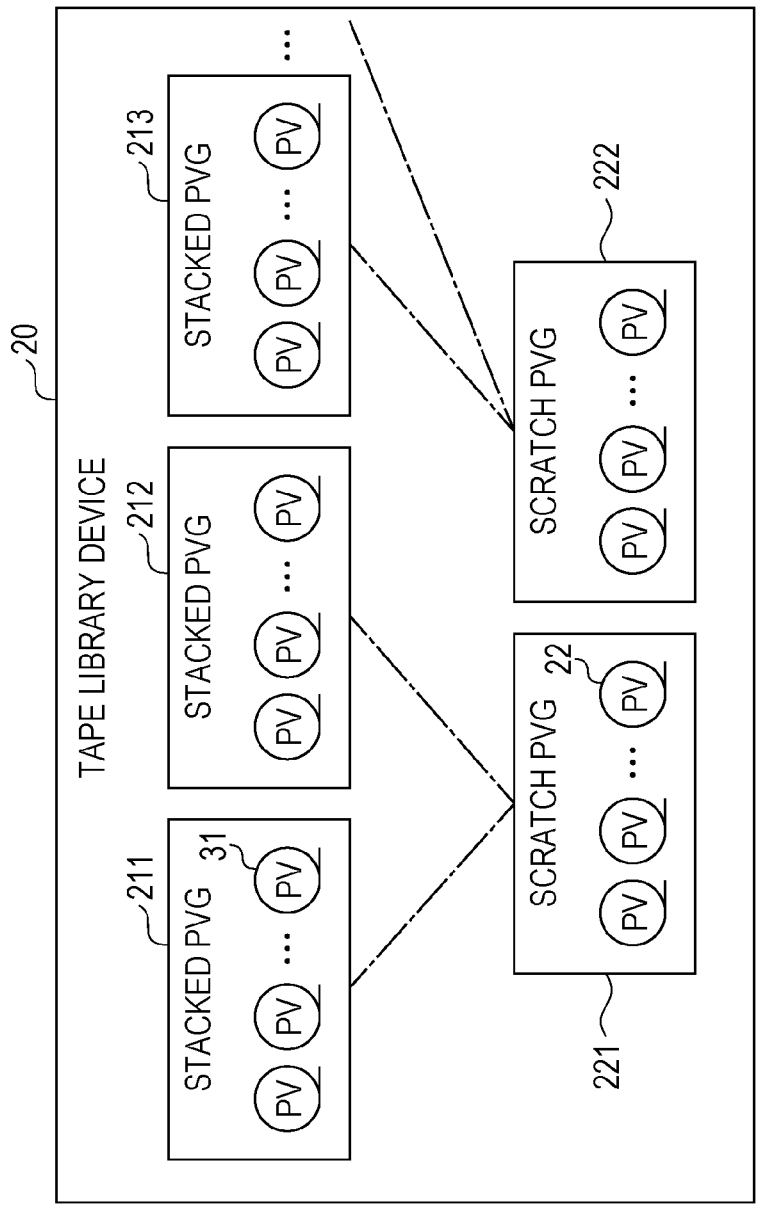
FIG. 5 is a view illustrating association of Stacked PVG and Scratch PVG.

In addition, the group generation unit 111 associates one or more Stacked PVG 210 with a generated Scratch PVG. For example, as illustrated in FIG. 5, the group generation unit 111 associates Scratch PVGs 221 and 222 with the Stacked PVGs 211 to 213. FIG. 5 is a view illustrating association of Stacked PVG and Scratch PVG. When each of Scratch PVGs is not distinguished, Scratch PVG is hereinafter referred to as "Scratch PVG 220".

As described below, each Stacked PVG 210 may use a physical volume 22 belonging to the associated Scratch PVG 220. More specifically, in response to a request for a physical volume 22 from the Stacked PVG 210, the associated Scratch PVG 220 may provide the physical volume 22. Thus, the physical volume 22 may be operated efficiently by associating a plurality of Stacked PVGs 210 with one Scratch PVG 220.

Using a PVG management table as illustrated in FIG. 6, the group generation unit 111 manages information on the Stacked PVG 210, information on the Scratch PVG 220, and information on association of the Stacked PVG 210 and the Scratch PVG 220. FIG. 6 is a view of an example of a PVG management table. As illustrated in FIG. 6, the group generation unit 111 registers in the PVG management table 121 information on the Scratch PVG 220 that corresponds to and is associated with an identifier of each physical volume group (PVG). In addition, the group generation unit 111 registers in the PVG management table 121 information on the tape library device 20 stored in each physical volume group and the number of physical volumes 22 belonging to that physical volume group.

Furthermore, the group generation unit 111 registers a threshold of Soft Minimum (SOFT MIN in FIG. 6), a threshold of Hard Minimum (HARD MIN in FIG. 6), a threshold of Absolute Minimum (ABSOLUTE MIN in FIG. 6), and a valid logical volume (LV) base rate in the PVG management table 121. Here, Soft Minimum, Hard Minimum and Absolute Minimum are conditions to start execution of a normal reorganization process on each physical volume group specified by an administrator. Soft Minimum is a case in which usable physical volumes 22 are less than a predetermined threshold and a ratio of valid physical volumes 31 exceeds a base rate of valid logical volumes. In addition, Hard Minimum is a case in which usable physical volumes 22 are less than a predetermined threshold that is smaller than the threshold of Soft Minimum. Absolute Minimum is a case in which usable physical volumes 22 are less than a predetermined threshold that is smaller than the threshold of Hard Minimum. For example, the threshold of Absolute Minimum is set to a value with which it may be determined that there is no physical volume 22 to execute migration, as far as the value is equal to or less than the threshold of Absolute Minimum.

Then, the group generation unit 111 stores the generated PVG management table 121 in the information storage unit 102.

Figure 7:
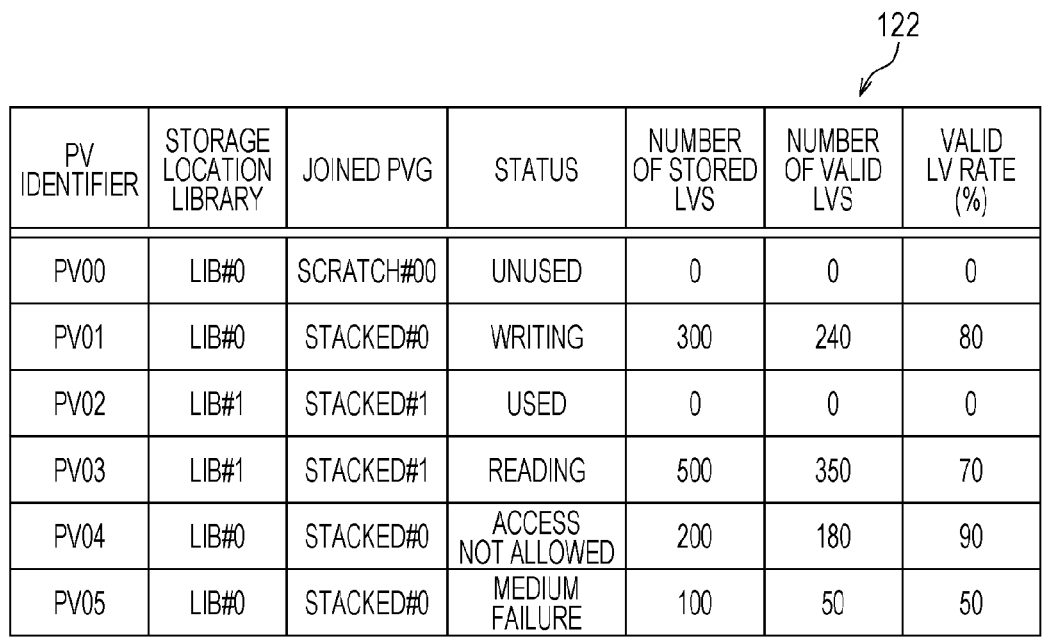
FIG. 7 is a view of an example of a PV management table.

The volume management unit 112 manages a logical volume 31 stored in each physical volume 22. Specifically, the volume management unit 112 performs management using a PV management table 122 illustrated in FIG. 7. FIG. 7 is a view of an example of a PV management table.

The volume management unit 112 registers in the PV management table 122 information on a storage location tape library device 20 (storage location library in FIGS. 6,7,11 to 13, 18), information on a joined physical volume group, usage status, the number of stored logical volumes, the number of valid logical volumes, and a valid LV rate which is a ratio of valid logical volumes, in each physical volume 22. The usage status indicates whether a physical volume 22 is unused, used, writing, reading, has a medium failure, or is not allowed to access, or the like. When the status is "access not allowed" or "medium failure", that physical volume may not be used. In addition, a physical volume 22 being written or read is one form of being used.

When the data migration processing unit 104 starts writing to a physical volume 22, the volume management unit 112 changes status of the physical volume 22 at a write location to "writing" in the PV management table 122. After the writing by the data migration processing unit 104 completes, the volume management unit 112 changes the status of the physical volume 22 at the write location to "used" in the PV management table 122.

In addition, when the data migration processing unit 104 starts reading from a physical volume 22, the volume management unit 112 changes status of the physical volume 22 at read source to "reading" in the PV management table 122. After the reading by the data migration processing unit 104 ends, the volume management unit 112 changes the status of the physical volume 22 at the read source to "used" in the PV management table 122. to "unused"

In addition, when a data management unit 141 of the data migration processing unit 104 performs deletion of a logical volume 31, the volume management unit 112 acquires from the data management unit 141 information on the physical volume 22 and the logical volume 31 on which the deletion is performed. Then, the volume management unit 112 updates the number of logical volumes 31 stored by the physical volume 22 from which the logical volume 31 is deleted, the number of valid logical volumes 31, and a ratio of the valid logical volumes 31 in the PV management table 122.

Then, when there is a physical volume 22 which no longer has a valid logical volume 31 due to deletion, the volume management unit 112 identifies that physical volume 22 from the PV management table 122. Then, the volume management unit 112 changes a joined group of the identified physical volume 22 from Stacked PVG 210 to Scratch PVG 220 in the PV management table 122. With this, the volume management unit 112 moves the identified physical volume 22 from the Stacked PVG 210 to the identified Scratch PVG 220.

In addition, when execution of migration is determined or when a logical volume 31 is deleted, the volume management unit 112 receives from a reorganization processing unit 142 an instruction to reserve physical volumes 22 corresponding to the number of physical volumes to be reserved (Pn). Then, the volume management unit 112 selects Pn physical volumes 22 belonging to the Scratch PVG 220 from the PV management table 122. Then, the volume management unit 112 changes the joined group of the selected physical volumes 22 from the Scratch PVG 220 to the Stacked PVG 210 in the PV management table 122. With this, the volume management unit 112 moves the selected physical volumes 22 from the Scratch PVG 220 to the Stacked PVG 210. Then, the volume management unit 112 notifies the reorganization processing unit 142 of completion of the movement of the physical volumes 22 to the Stacked PVG 210.

In addition, when migration, reorganization, and advance reorganization processes by the data migration processing unit 104 are complete, the volume management unit 112 acquires information on a processing target logical volume 31 from the data migration processing unit 104. The volume management unit 112 further receives information on physical volumes 22 at a movement source and a movement destination of the processing target logical volume 31 from the data migration processing unit 104.

Then, the volume management unit 112 updates the number of logical volumes 31 stored by the physical volume 22 at the movement destination, the number of valid logical volumes 31, and a ratio of the valid logical volumes 31 in the PV management table 122. Furthermore, the volume management unit 112 changes status of the physical volume 22 to "used" at the writing location in the PV management table 122.

The volume management unit 112 further updates the number of logical volumes 31 stored by the physical volume 22 at the movement source, the number of the valid logical volumes 31, and a ratio of the valid logical volumes 31 in the PV management table 122.

Then, if valid logical volumes 31 are stored in the physical volume 22 at the movement source, the volume management unit 112 changes the status of the physical volume 22 at the movement source to "used".

In contrast, if no valid logical volumes 31 are stored, the volume management unit 112 changes the status of the physical volume 22 at the movement source to "unused". Then, from the PVG management table 121, the volume management unit 112 identifies Scratch PVG 220 corresponding to Stacked PVG 210 including the physical volume 22 at the movement source. Then, the volume management unit 112 changes the joined group of the physical volume 22 at the movement source to the identified Scratch PVG 220 in the PV management table 122. With this, the volume management unit 112 moves the physical volume 22 at the movement source from the Stacked PVG 210 to the identified Scratch PVG 220. This volume management unit 112 corresponds to an example of a "movement unit".

When the data management unit 141 determines to execute migration or performs a deletion process, the determination unit 105 receives a notice from the data management unit 141. Then, the determination unit 105 identifies Stacked PVG 210 including a processing target physical volume 22 from the PV management table 122, and makes the Stacked PVG 210 a determination target on advance reorganization. The Stacked PVG 210 that the determination unit 105 targets for determination on advance reorganization is hereinafter referred to as a "determination target Stacked PVG 210".

The determination unit 105 determines capacity of total invalid areas (Ci) of physical volumes 22 in the determination target Stacked PVG 210. Here, the total invalid areas are a sum of areas of the physical volumes 22 that store invalidated data due to updated data. In addition, the determination unit 105 divides the calculated capacity of total invalid areas (Ci) by the capacity of one physical volume 22. Then, the determination unit 105 determines whether or not a division result is equal to or less than 1. More specifically, the determination unit 105 determines whether or not the capacity of total invalid areas (Ci) is equal to or larger than the capacity of one physical volume 22. In other words, the determination unit 105 determines whether or not there is a set of physical volumes 22 in which a sum of the invalid areas is equal to or larger than the capacity of one physical volume 22.

Then, the determination unit 105 acquires a ratio of valid areas in each of physical volumes 22 belonging to the determination target Stacked PVG 210, from the PV management table 122. Then, the determination unit 105 calculates a ratio of valid areas in the entire determination target Stacked PVG 210. Then, the determination unit 105 determines whether or not the ratio of valid areas in the entire determination target Stacked PVG 210 is equal to or more than a base rate of the valid physical volumes 22 listed in the PVG management table 121.

When the ratio of valid areas is equal to or more than the base rate of the valid physical volumes and when the capacity of total invalid areas is equal to or more than the capacity of one physical volume 22, the determination unit 105 determines to execute advance reorganization on the determination target Stacked PVG 210. In other words, when there is a set of physical volumes 22 in which the ratio of valid areas is equal to or higher than the base rate of the valid physical volumes and the capacity of total invalid areas is equal to or more than the capacity of one physical volume 22, the determination unit 105 determines to execute advance reorganization. Then, the determination unit 105 instructs the data migration processing unit 104 to execute advance reorganization on the determination target Stacked PVG 210.

In contrast to this, when the ratio of valid areas is lower than the base rate of valid physical volumes or when the capacity of total invalid areas is smaller than the capacity of one physical volume 22, the determination unit 105 notifies the data migration processing unit 104 that advance reorganization is not to be executed.

The data migration processing unit 104 has the data management unit 141 and the reorganization processing unit 142. The data management unit 141 performs, for example, migration, deletion of a logical volume 31, and writing of a logical volume 31 to the disk array device 30. In addition, the reorganization processing unit 142 executes normal reorganization and advance reorganization.

When receiving from the read and write unit 103 a notice that a logical volume 31 is stored, the data management unit 141 performs a process to determine to execute the following migration that stores into a physical volume 21 the logical volume 31 stored in the disk array device 30. However, the migration may be executed at any time after the notice is received. Migration by the data migration processing unit 104 is described below.

The data management unit 141 checks the disk array device 30 and acquires a data amount (D) of data on which migration is executed.

Then, the data management unit 141 identifies Stacked PVG 210 at a migration destination for writing a logical volume 31. The data management unit 141 further identifies from the PV management table 122 physical volumes 22 belonging to the Stacked PVG 210 at the migration destination. Then, the data management unit 141 acquires capacity of unused areas from each of the identified physical volumes 22. Then, the data management unit 141 totals the capacity of the determined unused areas to determine total empty capacity (Cb) of the Stacked PVG 210 at the migration destination.

Then, the data management unit 141 compares the data amount (D) of the data on which migration is executed with the total empty capacity (Cb) of the Stacked PVG 210 at the migration destination.

When the total empty capacity (Cb) is larger than the data amount (D), the data management unit 141 determines to execute migration without changing a configuration of the physical volumes 22 belonging to the Stacked PVG 210 at the migration destination. In this case, the data management unit 141 sets the number of physical volumes 22 to be reserved (Pn) from Scratch PVG 220 as 0. Then, the data management unit 141 notifies the reorganization processing unit 142 that execution of migration is determined and that Pn=0.

In contrast to this, when the total empty capacity (Cb) is smaller than the data amount (D), data may not be directly written to the Stacked PVG 210 at the migration destination. Thus, the data management unit 141 performs a process to reserve the capacity as described below.

The data management unit 141 subtracts the total empty capacity (Cb) from the data amount (D) to determine the capacity to reserve for migration (D-Cb). Then, the data management unit 141 divides the capacity (D-Cb) to reserve for migration by the capacity of one physical volume 22 (Pu), rounds up, and calculates the number of physical volumes 22 to be reserved (Pn). Then, the data management unit 141 determines to execute migration. Afterward, the data management unit 141 notifies the reorganization processing unit 142 of the determination to execute migration and the number of physical volumes 22 to be reserved (Pn).

Then, the data management unit 141 receives an instruction to execute migration from the reorganization processing unit 142. Then, the data management unit 141 executes migration. Specifically, the data migration processing unit 104 acquires from the disk array device 30 a logical volume 31, which is a migration target, and stores the logical volume 311 in the physical volume 22 of the Stacked PVG 210 of the migration destination.

Then, the data management unit 141 notifies the volume management unit 112 of information on the logical volume 31 moved by migration, information on a physical volume 22 at a movement source, and information on a physical volume at a movement destination.

In addition, the data management unit 141 receives from the read and write unit 103 an instruction to delete a logical volume 31 and deletes the specified logical volume 31 from a physical volume 22. Then, after deleting the logical volume 31, the data management unit 141 notifies the volume management unit 112 of information on the deleted logical volume 31 and information on the physical volume 22 including the logical volume. The data management unit 141 further notifies the reorganization processing unit 142 of information on the Stacked PVG 210 including the physical volume 22 from which the logical volume 31 is deleted, as well as a notice on deletion. This data management unit 141 corresponds to an example of a "data storage unit".

The reorganization processing unit 142 receives the notice on determination to execute migration or deletion from the data management unit 141. Then, the reorganization processing unit 142 asks the determination unit 105 to make a determination on an advance reorganization process. Furthermore, the data migration processing unit 104 notifies the determination unit 105 of information on Stacked PVG 210 including the physical volume 22 as the migration target, or the physical volume 22 from which the logical volume 31 is deleted. The Stacked PVG 210 notified to the determination unit 105 is hereinafter referred to as "target Stacked PVG 210".

When receiving from the determination unit 105 a notice that advance reorganization is not executed, the reorganization processing unit 142 acquires the number of valid logical volumes 31 of each of the physical volumes 22 belonging to the target Stacked PVG 210 from the PV management table 122. The reorganization processing unit 142 further acquires a ratio of valid logical volumes of the physical volumes 22 from the PV management table 122. The reorganization processing unit 142 further acquires the base rate of valid logical volumes 31 set in the target Stacked PVG 210.

In addition, the reorganization processing unit 142 acquires a threshold of Soft Minimum, a threshold of Hard Minimum, or a threshold of Absolute Minimum of the target Stacked PVG 210 from the PVG management table 121. Then, the reorganization processing unit 142 compares the number of valid logical volumes 31 in each of the physical volumes 22 with each threshold.

When the number of valid logical volumes 31 in a certain physical volume 22 is equal to or more than the threshold of Soft Minimum and execution of migration is determined, the reorganization processing unit 142 instructs the data management unit 141 to execute migration. In contrast to this, if execution of migration is not determined, the reorganization processing unit 142 finishes processing.

On the one hand, when the number of valid logical volumes 31 of a certain physical volume is less than the threshold of Soft Minimum, the reorganization processing unit 142 determines whether or not a ratio of valid logical volumes in that physical volume 22 is equal to or more than the base rate. When the ratio of valid logical volumes is equal to or more than the base rate, and if execution of migration is determined, the reorganization processing unit 142 instructs the data management unit 141 to execute migration. In contrast to this, if execution of migration is not determined, the reorganization processing unit 142 finishes processing.

In contrast to this, when the ratio of valid logical volumes is lower than the base rate, the data migration processing unit 104 performs a reorganization process on that physical volume 22. In addition, when the number of valid logical volumes 31 in a certain physical volume 22 is equal to or less than the threshold of Absolute Minimum or equal to or less than the threshold of Hard Minimum, the reorganization processing unit 142 executes reorganization of that physical volume 22.

Figure 8:
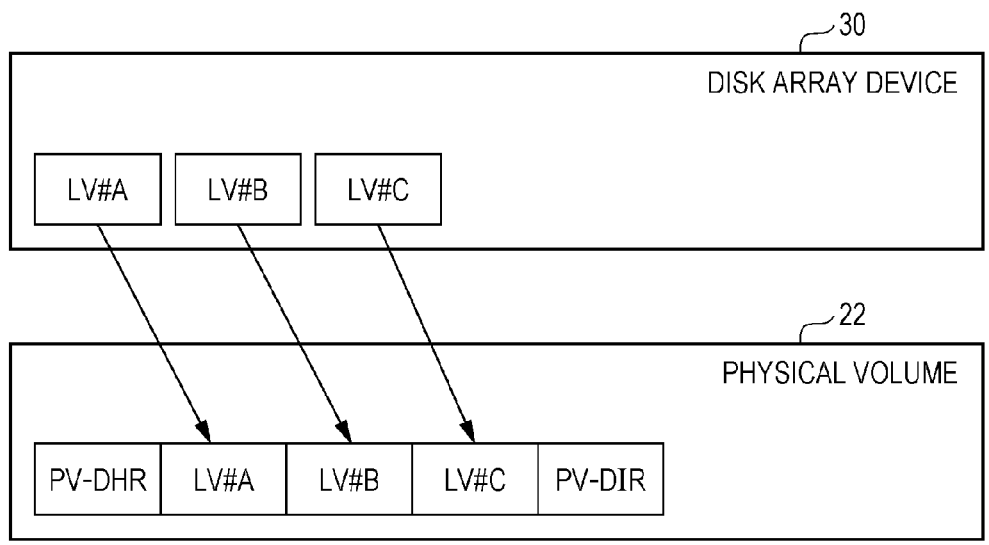
FIG. 8 is a conceptual diagram of a migration process.
Figure 9:
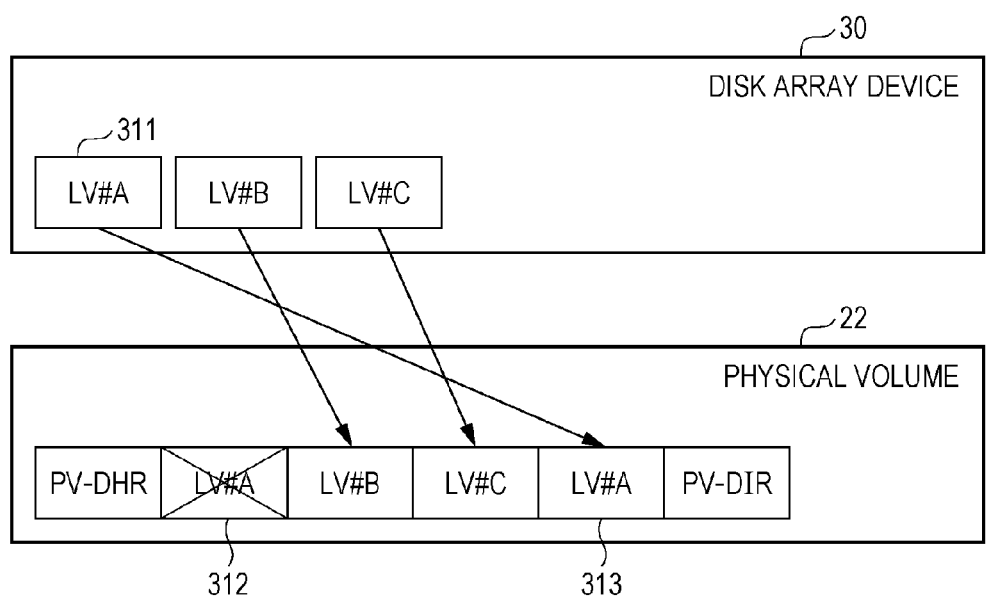
FIG. 9 is a conceptual diagram of a migration process when a logical volume is updated.

Now, a reorganization process is described. First, a reason for executing reorganization is described with reference to FIG. 8 to FIG. 10. FIG. 8 is a conceptual diagram of a migration process. In addition, FIG. 9 is a conceptual diagram of a migration process when a logical volume is updated. In addition, FIG. 10 is a conceptual diagram of a reorganization process.

In FIG. 8, LV#A, LV#B, and LV#C are stored as a logical volume 31 in the disk array device 30, and are to be migrated in the order of LV#A, LV#B, and LV#C. The reorganization processing unit 142 first stores LV#A after PV-DHR of a physical volume 22. Then, the reorganization processing unit 142 stores LV#B after LV#A. Furthermore, the data migration processing unit 104 stores LV#C after LV#B.

Then, as illustrated in FIG. 9, suppose that a logical volume 311, which is the updated LV#A, is stored in the disk array device 30. In this case, the reorganization processing unit 142 stores the new LV#A after LV#C, as a logical volume 313. Then, a logical volume 312, which is the LV#A before being updated, becomes an invalid logical volume 31. In this case, an area of the logical volume 312 in the physical volume 22 becomes an unusable area.

Figure 10:
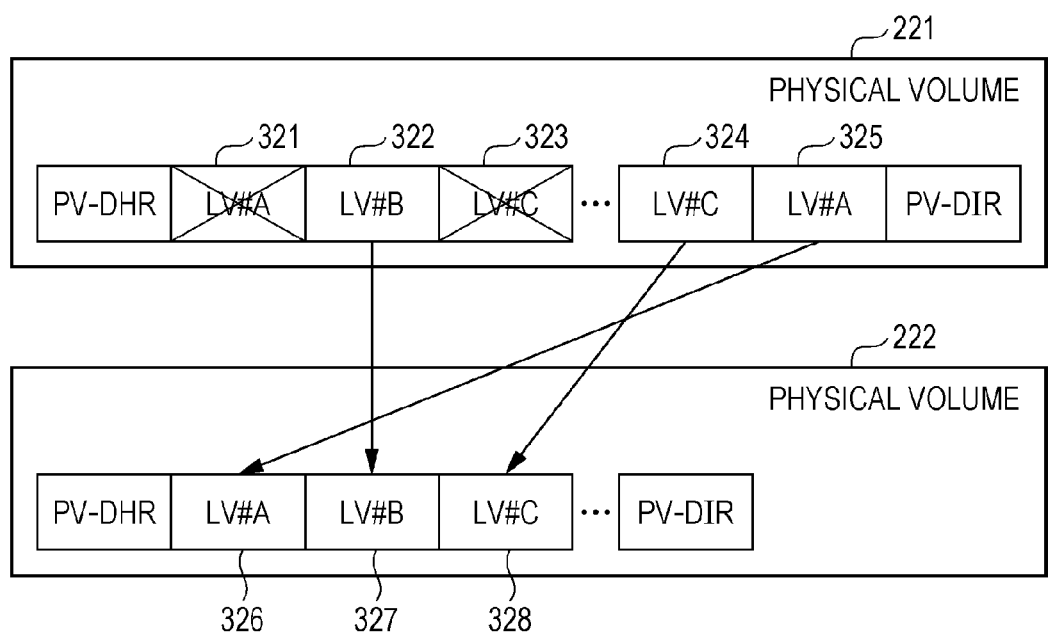
FIG. 10 is a conceptual diagram of a reorganization process.

As such, when updating of the logical volume 31 is repeated, as illustrated by a physical volume 221 in FIG. 10, for example, invalid logical volumes 31 increase, thus resulting in the status in which there are many unusable areas. Thus, the reorganization processing unit 142 migrates valid logical volumes 322, 324, and 325 in the physical volume 221 to an unused physical volume 222 and stores the LV#A to LV#C as valid logical volumes 326 to 328. In this case, since invalid logical volumes 321 and 323 are not migrated to the physical volume 222, the physical volume 222 has only valid logical volume 31, resulting in no useless area. Then, since the physical volume 221 no longer has the valid logical volume 31, all logical volumes are deleted and may newly become usable as an unused logical volume 31. Such a reorganization process may improve the utilization efficiency of a physical volume 22.

Referring back to FIG. 3, operation of a reorganization process by the reorganization processing unit 142 is described in detail. A valid logical volume 31 stored in a physical volume 22 which is a reorganization process target is referred to as a target logical volume 31.

The reorganization processing unit 142 determines whether or not used physical volumes 22 in the target Stacked PVG 210 include a physical volume 22 having a free space in which the target logical volume 31 may be stored. When there is a physical volume 22 having a free space in which the target logical volume 31 may be stored, the reorganization processing unit 142 moves the target logical volume 31 to that physical volume 22. Then, the reorganization processing unit 142 notifies the volume management unit 112 of a physical volume 22 at a movement source of the target logical volume 31. The reorganization processing unit 142 also notifies the volume management unit 112 of information on a physical volume at a movement destination of the target logical volume 31 and information on the moved logical volume 31.

On the one hand, if there is no physical volume 22 having a free space in which the target logical volume 31 may be stored, the reorganization processing unit 142 identifies Scratch PVG 220 corresponding to the target Stacked PVG 210 from the PVG management table 121. Then, the reorganization processing unit 142 selects an unused physical volume 22 from the identified Scratch PVG 220. Then, the reorganization processing unit 142 instructs the volume management unit 112 to move the selected physical volume 22 to the target Stacked PVG 210.

When receiving from the volume management unit 112 the notice on completion of the movement of the physical volume 22 to the Stacked PVG 210, the reorganization processing unit 142 moves the target logical volume 31 to the moved physical volume 22.

If execution of migration is determined after reorganization is executed, the reorganization processing unit 142 instructs the data management unit 141 to execute migration.

If execution of migration is not determined, the reorganization processing unit 142 notifies the volume management unit 112 of information on the moved logical volume 31, information on the physical volume 22 at the movement source, and information on the physical volume 22 at the movement destination.

On the one hand, when receiving an instruction to execute advance reorganization from the determination unit 105, the reorganization processing unit 142 identifies physical volumes 22 belonging to the target Stacked PVG 210 from the PV management table 122. Then, the reorganization processing unit 142 determines size of a valid logical volume 31 area of each identified physical volume 22.

Then, the reorganization processing unit 142 calculates a total valid area (Cv) which is a sum of areas of valid logical volumes 31 in all the physical volumes 22 belonging to the target Stacked PVG 210.

Then, the reorganization processing unit 142 divides the total valid area (Cv) by the capacity of one physical volume 22 (Pu), rounds up, and determines the number of physical volumes to be reserved for advance reorganization. Then, the reorganization processing unit 142 adds the number of physical volumes 22 to be reserved for advance reorganization to the number of physical volumes to be reserved (Pn) that is received from the data management unit 141, and newly determines the number of physical volumes 22 to be reserved (Pn).

The reorganization processing unit 142 also identifies Scratch PVG 200 corresponding to the target Stacked PVG 210 from the PVG management table 121. Then, the reorganization processing unit 142 notifies the volume management unit 112 that the number of physical volumes 22 to be reserved (Pn) is reserved from the identified Scratch PVG 220 of unused physical volumes 22. A physical volume 22 that is moved to the target Stacked PVG 210 by the volume management unit 112 is hereinafter referred to as a "reserved physical volume 22".

Then, the reorganization processing unit 142 receives from the volume management unit 112 a notice that the movement of the physical volume 22 to the Stacked PVG 210 is complete. Then, the reorganization processing unit 142 acquires a valid logical volume 31 stored in the physical volume 22 belonging to the target Stacked PVG 210 and a logical volume that is a migration target. Then, the reorganization processing unit 142 migrates the acquired logical volume 31 to the reserved physical volume 22.

Then, the reorganization processing unit 142 notifies the volume management unit 112 of information on the moved logical volume 31, information on the physical volume 22 at the movement source, and information on the physical volume 22 at the movement destination. The reorganization processing unit 142 further instructs the data management unit 141 to execute migration if execution of migration is determined.

When execution of migration is not determined, the reorganization processing unit 142 notifies the volume management unit 112 of the information on the moved logical volume 31 and the information on the physical volumes 22 at the movement source and destination, without giving an instruction on migration. This reorganization processing unit 142 corresponds to an example of a "data migration unit".

Figure 13:
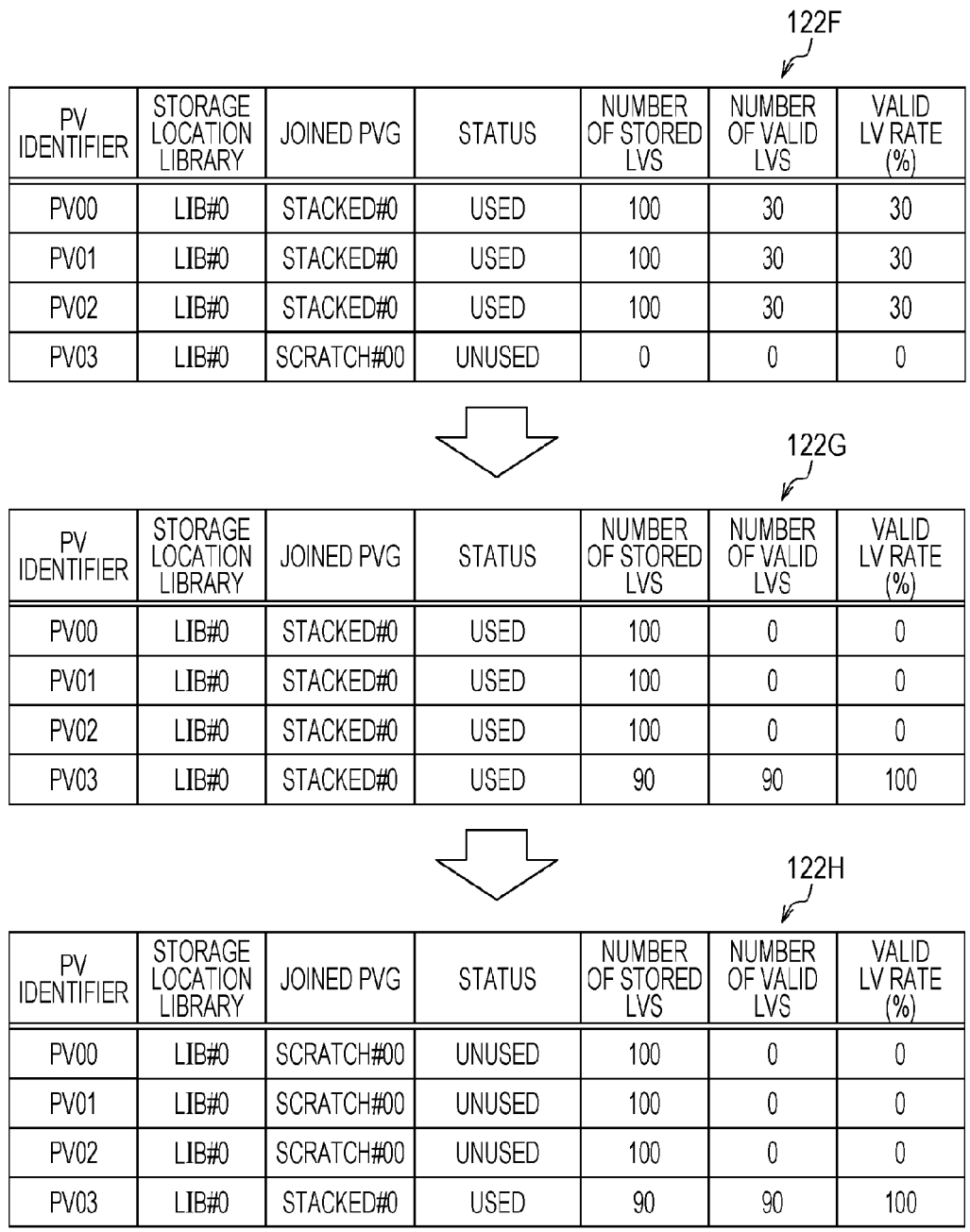
FIG. 13 is a view of an example illustrating transition in a PV management table when advance reorganization is executed.

Next, an example of transition in the PV management table when each process of migration, and deletion and reorganization of a logical volume 31 is performed is described below with reference to FIG. 11 to FIG. 13. FIG. 11 is a view of an example illustrating transition in the PV management table when migration is executed. FIG. 12 is a view of an example illustrating transition in the PV management table when a logical volume is deleted. FIG. 13 is a view of an example illustrating transition in the PV management table when advance reorganization is executed.

Transition in the PV management table 122 when migration is executed is described with reference to FIG. 11. Now, a description is given with a case in which a reorganization process is not performed by the reorganization processing unit as an example.

A table 122A in FIG. 11 represents status of the PV management table 122 before migration is executed. Here, there are three physical volumes 22 from PV00 to PV02. Then, in the status of the table 122A, the PVs 00 to 02 are all unused physical volumes 122 and belong to Scratch PVG 220 named Scratch#00. Since the PV00 to PV02 are unused, the number of volumes of the stored logical volumes 31, the number of valid logical volumes 31, and a ratio of the valid logical volumes 31 are all 0.

In the status of the table 122A, the data management unit 141 determines to store 100 logical volumes 31 stored in the disk array device 30, into the physical volume 22 of the PV00. Then, the data management unit 141 instructs the volume management unit 112 to migrate the PV00 from the Scratch#00 to the Stacked PVG 210 named Stacked#0. The volume management unit 112 changes the physical volume group including the PV00 to Stacked#0, as illustrated in a table 122B. With this, the PV00 is moved from the Scratch#00 to the Stacked#0.

After the group including the PV00 is changed to the Stacked#0, the data management unit 141 stores the 100 logical volumes 31, which are migration targets, into the PV00. In response to the storage of the logical volumes 31, the volume management unit 112 changes the number of valid physical volumes 22 in the PV00 to 100 in the PV management table 122. In this case, since the PV00 does not store any other logical volume 31, the volume management unit 112 also changes the number of stored physical volumes 22 to 100. In addition, since all the stored logical volumes 31 are valid logical volumes 31, the volume management unit 112 changes the ratio of valid logical volumes to 100%. With this migration, the PV management table 122 is updated from the table 122A to the table 122B.

Next, transition of the PV management table 122 when a logical volume is deleted is described below with reference to FIG. 12. Here, a description is given with a case in which there are physical volumes 22 of PV00 to PV02 of which the PV00, which is being used, is deleted. A table 122C is status of the PV management table 122 before deletion.

The data management unit 141 receives from the host 2 an instruction to delete the 100 logical volumes 31 stored in the PV00 belonging to the Stacked#0. Then, the data management unit 141 deletes the specified 100 logical volumes 31 from the PV00. After the deletion, the data management unit 141 notifies the volume management unit 112 of information on the logical volumes 31 deleted from the PV00. The volume management unit 112 reduces the number of valid physical volumes 22 of the PV00 by 100 in the PV management table 122. With this, the PV management table 122 transits from the table 122C to a table 122D.

Then, the volume management unit 112 confirms from the PV management table 122 in the status of the table 122D that there are no longer valid physical volumes 22 stored in the PV00. Then, the volume management unit 112 changes the joined group of the PV00 from the Stacked#0 to Scratch#00 in the PV management table 122. With this, the PV management table 122 transits from the table 122D to a table 122E. Then, the PV00 is moved from the Stacked#0 to the Scratch#00.

In addition, here, the number of logical volumes 31 stored in the PV00 remains unchanged. However, when the PV00 is moved from the Stacked#0 to the Scratch#00, all invalid logical volumes 31 may be deleted. In that case, after the PV00 is moved to the Scratch#00, the number of the stored logical volumes 31 becomes 0. The volume management unit 112 changes the number of logical volumes stored in the PV00 to 0 in the PV management table 122. The volume management unit 112 further changes the status of the PV00 to "unused" in the PV management table 122.

Next, transition in the PV management table 122 when advance reorganization is executed is described below with reference to FIG. 13. Here, there are physical volumes 22 of PV00 to PV03, among which the PV00 to PV02 belong to Stacked#0 which is Stacked PVG 210 and the PV03 belongs to Scratch#00 which is Scratch PVG 220. Now, a description is given with a case in which valid logical volumes 31 in the PV00 to PV02 are migrated to the PV03. A table 122F is status of the PV management table 122 before advance reorganization.

The reorganization processing unit 142 selects the PV00 to PV02 as a target for executing advance reorganization. Then, the reorganization processing unit 142 selects the PV03 as a physical volume 22 at a migration destination. The reorganization processing unit 142 instructs the volume management unit 112 to migrate the PV03 to the Stacked#0. The volume management unit 112 changes the joined group of the PV03 to Stacked#03 in the PV management table 122. With this, the PV03 is moved from the Scratch#00 to the Stacked#0.

After the PV03 is moved to the Stacked#0, the reorganization processing unit 142 migrates the valid logical volumes 31 stored in the PV00 to PV02 to the PV03. After the migration, the reorganization processing unit 142 notifies the volume management unit 112 of information on the migrated logical volumes 31, information on the PV00 to PV02, which are the physical volumes 22 at the migration source, and information on the PV03, which is the physical volume at the migration destination. When receiving the notice, the volume management unit 112 changes the number of the valid logical volumes 31 of the PV00 to PV02 and the ratio of the valid logical volumes 31 to 0 in the PV management table 122. The volume management unit 112 further changes the number of the logical volumes 31 and the number of the valid logical volumes stored by the PV03 to 90, which is a sum of the logical volumes 31 moved from the PV00-PV03, in the PV management table 122. In this case, since there are only valid logical volumes 31 in the PV03, the volume management unit 112 changes the ratio of the valid logical volumes 31 to 100%. With this, the PV management table 122 transits from the table 122F to a table 122G.

Then, the volume management unit 112 confirms from the PV management table 122 in the status of the table 122G that there are no valid physical volumes 22 stored in the PV00 to PV02. Then, the volume management unit 112 changes the joined group of the PV00 to PV02 from the Stacked#0 to the Scratch#00 in the PV management table 122. With this, the PV management table 122 transits from the table 122G to a table 122H. Then, the PV00 to PV02 are moved from the Stacked#0 to the Scratch#00.

Figure 14:
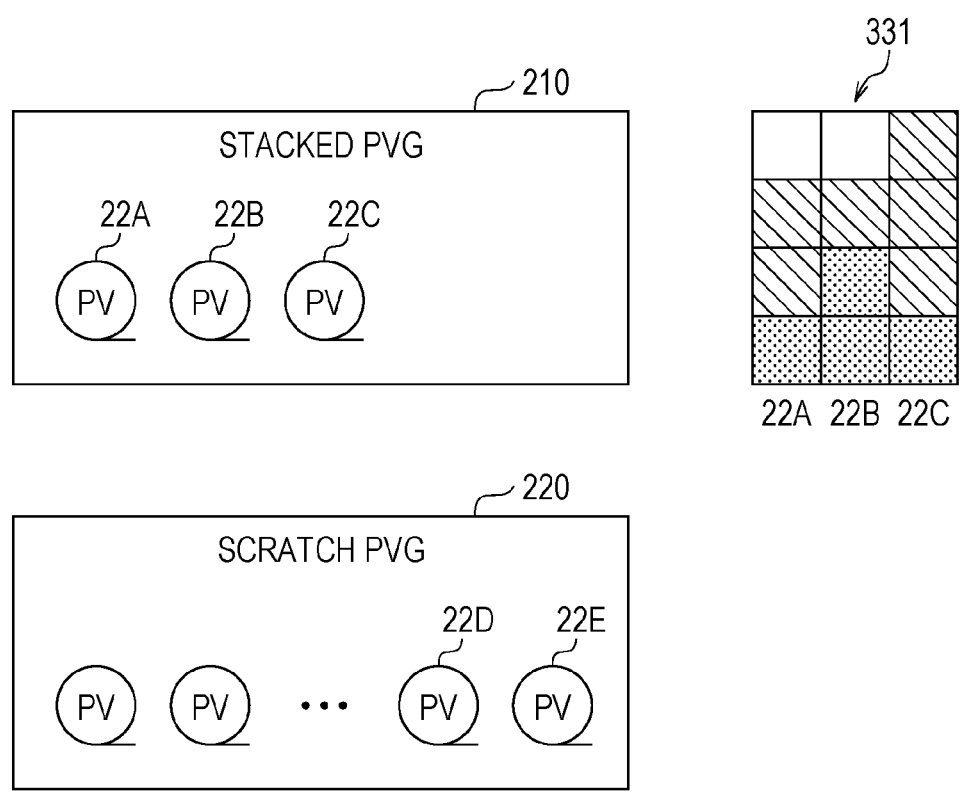
FIG. 14 is a view illustrating status of a physical volume and a logical volume prior to advance reorganization.
Figure 15:
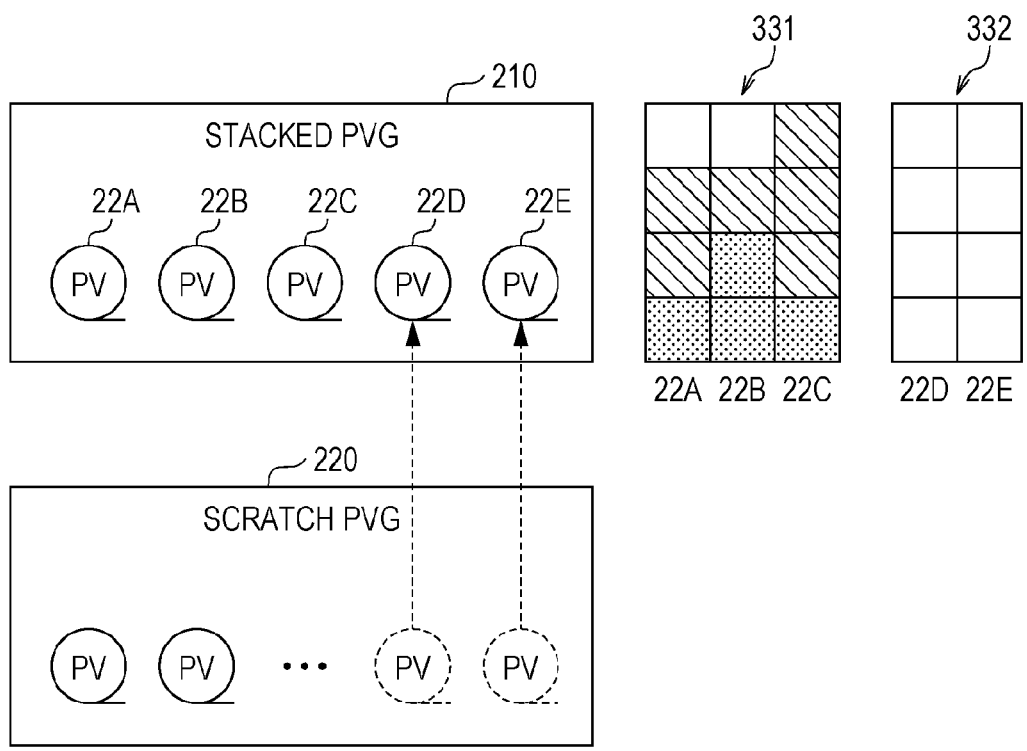
FIG. 15 is a view illustrating status of a physical volume and a logical volume when a physical volume is reserved.
Figure 16:
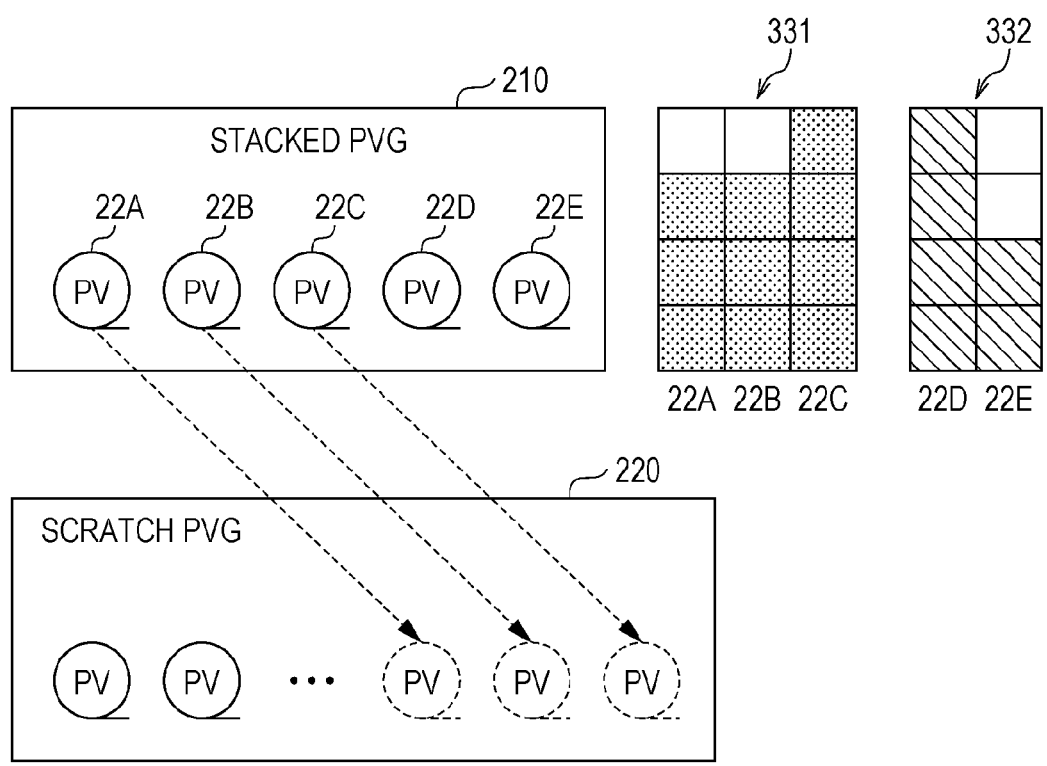
FIG. 16 is a view illustrating status of a physical volume and a logical volume after advance reorganization is executed.
Figure 17:
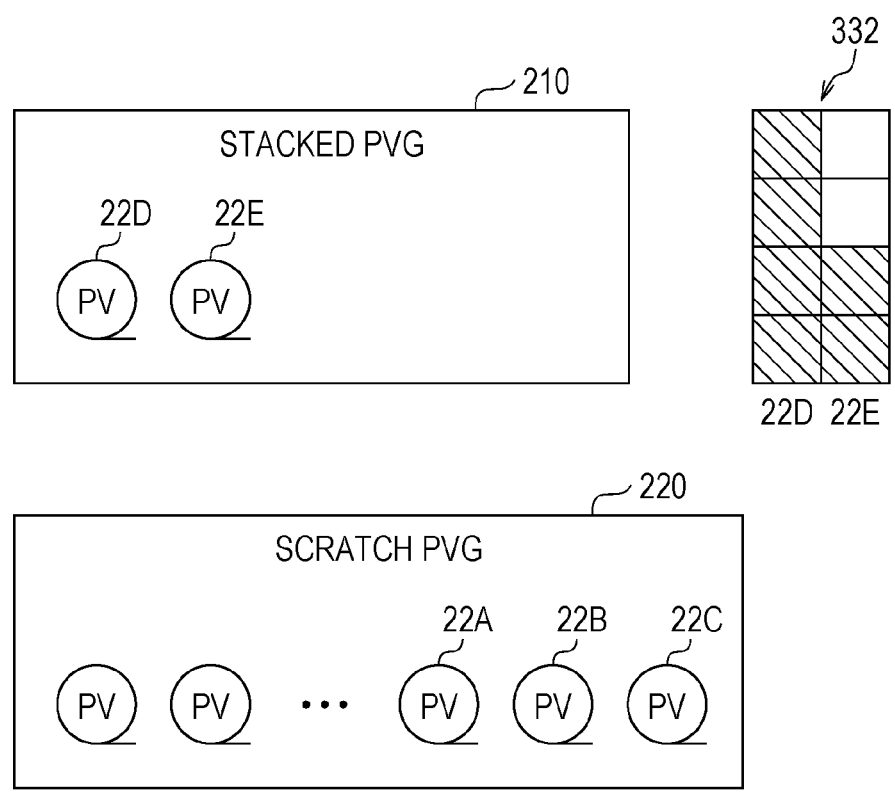
FIG. 17 is a view illustrating status of a physical volume and a logical volume after a physical volume is returned to Scratch PVG.

Next, an overview of an advance reorganization process by a virtual tape library 1 is further described below with reference to FIG. 14 to FIG. 17. FIG. 14 is a view illustrating status of a physical volume and a logical volume prior to advance reorganization. FIG. 15 is a view illustrating status of a physical volume and a logical volume when a physical volume is reserved. FIG. 16 is a view illustrating status of a physical volume and a logical volume after advance reorganization is executed. FIG. 17 is a view illustrating status of a physical volume and a logical volume after a physical volume is returned to Scratch PVG.

Here, a description is given with a case in which physical volumes 22A to 22C belong to Stacked PVG 210 and physical volumes 22D and 22E belong to Scratch PVG 220.

A logical volume group 331 represents status of logical volumes 31 stored in the physical volumes 22A to 22C. The leftmost column in the logical volume group 331 represents storage status of the logical volumes 31 in the physical volume 22A. In addition, the center column in the logical volume group 331 represents storage status of the logical volume 31 in the physical volume 22B. In addition, the rightmost column in the logical volume group 331 represents storage status of the logical volume 31 in the physical volume 22C. Then, a shaded areas in the logical volume group 331 are areas in which valid logical volumes 31 are stored. In addition, a dot-patterned areas in the logical volume group 331 are invalid areas. Furthermore, outlined areas are unused areas. In addition, the capacity of the physical volumes 22A to 22C is represented by each section indicated in the logical volume group 331. Here, a description is given on the assumption that the number of logical volumes 31 which may be stored in each section indicated in the logical volume group 331 is 10. For example, the capacity per one of the physical volumes 22A to 22C (Pu) is 40.

The reorganization processing unit 142 acquires capacity of invalid logical volumes 31 in the physical volumes 22A to 22C. Then, the reorganization processing unit 142 totals the acquired capacity to calculate capacity of total invalid areas (Ci) in the Stacked PVG 210. Here, the capacity of total invalid areas (Ci) is the number of dot-patterned blocks, which is 40. Then, the reorganization processing unit 142 divides the capacity of total invalid areas (Ci) by the capacity per one of the physical volumes 22A to 22C (Pu). Here, the reorganization processing unit 142 obtains 1 as a division result. Then, the reorganization processing unit 142 determines whether or not the division result is equal to or more than 1. In this example, since the division result is 1, the data migration processing unit 104 determines that the division result is equal to or more than 1. Here, since the division result is equal to or more than 1, the number of physical volumes 22 to be used may be reduced by 1 or more if only the valid physical volumes stored in the physical volumes 22A to 22C are stored.

Thus, the reorganization processing unit 142 acquires the capacity of valid logical volumes 31 in the physical volumes 22A to 22C. Then, the reorganization processing unit 142 totals the acquired capacity to calculate total valid area (Cv) of the Stacked PVG 210. Here, the capacity of total valid area (Cv) is the number of shaded blocks, which is 60. Then, the reorganization processing unit 142 divides the total valid area (Cv) by the capacity per one of the physical volumes 22A to 22C (Pu) to determine the number of physical volumes 22 to be reserved (Pn). In this example, the reorganization processing unit 142 divides 60 by 40, rounds up the remainder, and determines that the number of the physical volumes 22 to be reserved (Pu) is two.

Then, the reorganization processing unit 142 notifies the volume management unit 112 of an instruction to move the two physical volumes 22 from the Scratch PVG 220 to the Stacked PVG 210. Upon receipt of the notice, the volume management unit 112 changes the PV management table 122 and moves the physical volumes 22D and 22E from the Scratch PVG 220 to the Stacked PVG 210, as illustrated in FIG. 15. In FIG. 15, the physical volumes 22 depicted by the dashed lines represent the physical volumes 22D and 22E which are already moved. In addition, dashed line arrows represent migration of the physical volumes 22D and 22E to the Stacked PVG 210.

The logical volume group 332 in FIG. 15 represents status of the logical volumes 31 stored in the physical volumes 22D and 22E. The leftmost column in the logical volume group 332 represents storage status of the logical volumes 31 in the physical volume 22D. In addition, the rightmost column in the logical volume group 331 represents storage status of the logical volumes 31 in the physical volume 22E. In this status, both the physical volumes 22D and 22E do not store any logical volume 31.

The reorganization processing unit 142 migrates valid logical volumes 31 stored in the physical volumes 22A to 22C to the physical volumes 22D to 22E. With this, the status of the logical volume groups 331 and 332 becomes status illustrated in FIG. 16. More specifically, the physical volumes 22A to 22C no longer store the valid logical volumes 31, as illustrated in the logical volume group 331. In contrast to this, the physical volumes 22D and 22E store the 60 valid logical volumes 31, as illustrated in the logical volume group 332.

The volume management unit 112 acquires from the data migration processing unit 104 information on the migrated logical volumes 31, information on the physical volumes 22A to 22C at the migration source, and information on the physical volumes 22D and 22E at the migration destination. Then, the volume management unit 112 updates the PV management table 122 according to the acquired information. Subsequently, the volume management unit 112 uses the PV management table 122 to identify the physical volumes 22A to 22C that store no valid logical volumes 31. Here, since the physical volumes 22A to 22C do not store the valid logical volumes 31, the physical volumes 22A to 22C may be migrated to the Scratch PVG, as depicted by dashed line arrows in FIG. 16.

Thus, the volume management unit 112 changes the joined group of the physical volumes 22A to 22C from the Stacked PVG210 to the Scratch PVG 220 in the PV management table 122. With this, the physical volumes 22A to 22C are moved to the Scratch PVG 220, as illustrated in FIG. 17. Afterward, the volume management unit 112 may handle the physical volumes 22A to 22C as unused disks. In addition, the volumes 22D and 22E that store only the valid logical volumes 31 belong to the Stacked PVG 210, as illustrated in the logical volume group 332.

Next, transition in the PV management table 122 when the advance reorganization illustrated in FIG. 14 to FIG. 17 is executed is described below with reference to FIG. 18. FIG. 18 is a view illustrating transition in the PV management table when the advance reorganization illustrated in FIG. 14 to FIG. 17 is executed. Here, it is assumed that Stacked PVG 210, which is an advance reorganization target, is Stacked#0 and that Scratch PVG 220, which is a storage location of physical volumes 22, is Scratch#1.

A table 1223 is the PV management table 122 illustrating status of each of the physical volumes 22A to 22E before the advance organization is executed. According to the status of the table 122J, the physical volumes 22A to 22C belongs to the Stacked#0 and the status is used. In contrast to this, the physical volumes 22D and 22E belongs to the Scratch#0 and the status is unused.

The volume management unit 112 receives an instruction from the data migration processing unit 104 and changes the joined group of the physical volumes 22D and 22E from Scratch#1 to Stacked PVG#0 in the PV management table 122. Then, when the reorganization processing unit 142 executes the advance reorganization, the volume management unit 112 changes the number of valid logical volumes in the physical volumes 22A to 22C to 0 and the ratio of the valid logical volumes 31 to 0 in the PV management table 122. The volume management unit 112 further changes the number of logical volumes 31 and the number of valid logical volumes stored by the physical volume 22D to 40, and the ratio of the valid logical volumes 31 to 100% in the PV management table 122. The volume management unit 112 also changes the number of logical volumes 31 and the number of valid logical volumes stored by the physical volume 22E to 20, and the ratio of the valid logical volumes 31 to 100% in the PV management table 122. In addition, the volume management unit 112 changes status of the physical volumes 22D and 22E to "used" in the PV management table 122. With this, the PV management table 122 transits from the status in the table 1223 to the status in a table 122K.

Then, the volume management unit 112 refers to the table 122K to confirm that the physical volumes 22A to 22C do not have any valid logical volumes 31. Then, the volume management unit 112 changes the joined group of the physical volumes 22A to 22C from the Stacked#0 to the Scratch#1 in the PV management table 122. The volume management unit 112 further changes the status of the physical volumes 22A to 22C to "unused" in the PV management table 122. With this, the PV management table 122 transits from the status in the table 122K to status in a table 122L.

Figure 19:
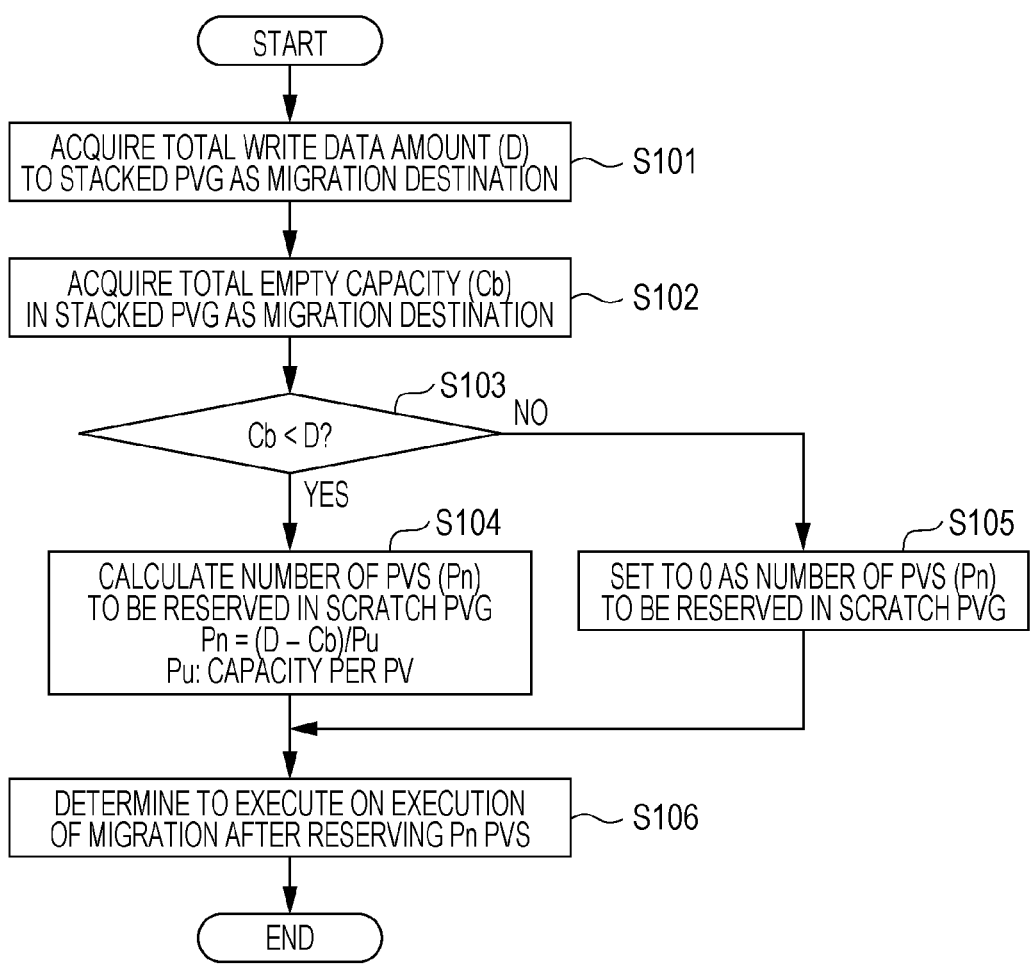
FIG. 19 is a flow chart of a process to determine to execute migration by a virtual tape library according to the embodiment.

Next, flow of a process to determine to execute migration by the virtual tape library 1 according to this example is described below with reference to FIG. 19. FIG. 19 is a flow chart of the process to determine to execute migration by the virtual tape library according to the embodiment.

The data management unit 141 acquires a total written data amount (D) to Stacked PVG 210 at a migration destination from a logical volume 31 which is a migration target stored in the disk array device 30 (step S101).

Then, the data management unit 141 confirms each physical volume 22 belonging to the Stacked PVG 210 at the migration destination and acquires total empty capacity (Cb) at the Stacked PVG 210 at the migration destination (step S102).

Then, the data management unit 141 determines whether or not the total empty capacity (Cb) is less than the total written data amount (D) (step S103). When the total empty capacity (Cb) is less than the total written data amount (D) (step S103: positive), the data management unit 141 calculates the number of physical volumes to be reserved (Pn) from Scratch PVG 220. Specifically, the data management unit 141 divides a value obtained by subtracting the total empty capacity (Cb) from the total written data amount (D) by the capacity per one physical volume 22 (Pu) and calculates the number of physical volumes to be reserved (Pn) (step S104).

In contrast to this, when the total empty capacity (Cb) is equal to or more than the total written data amount (D) (step S103: negative), the data management unit 141 sets the number of physical volumes to be reserved (Pn) to 0 (step S105).

Then, the data management unit 141 determines to execute migration after reserving the Pn physical volumes 22 (step S106). Subsequently, the data management unit 141 notifies the reorganization processing unit 142 of the number of the physical volumes 22 to be reserved (Pn) and the determination to execute migration.

Figure 20:
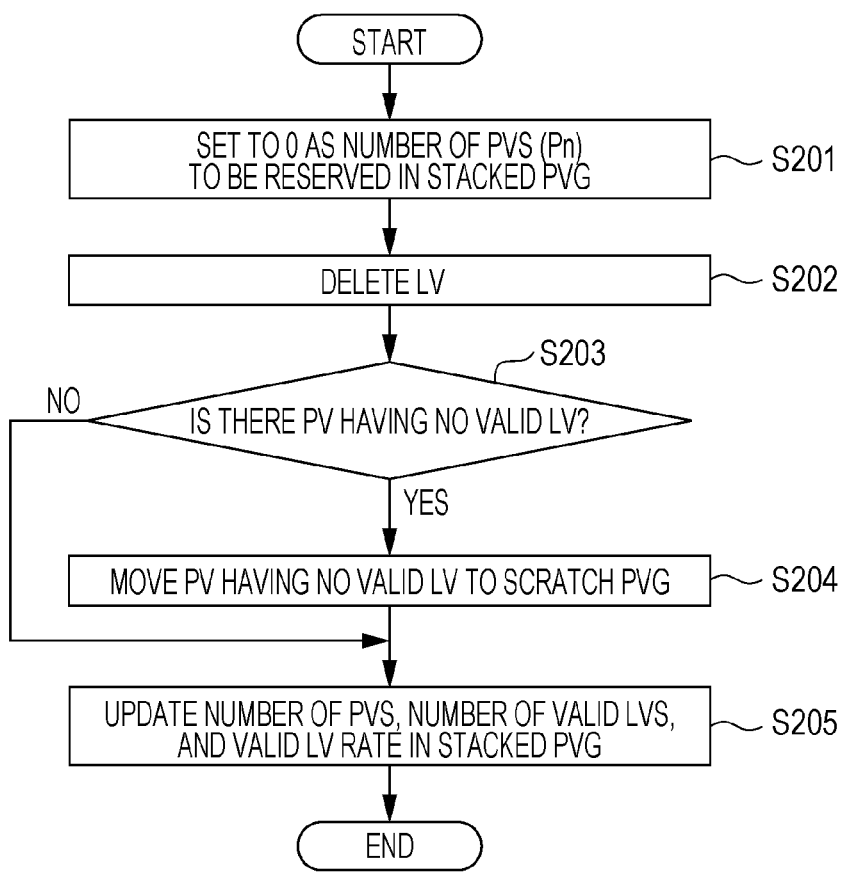
FIG. 20 is a flow chart of a deletion process by the virtual tape library according to the embodiment.

Next, flow of a process to delete by the virtual tape library 1 according to this example is described below with reference to FIG. 20. FIG. 20 is a flow chart of a deletion process by the virtual tape library according to the embodiment.

The data management unit 141 receives an instruction to delete a logical volume 31 from the host 2 and sets the number of physical volumes to be reserved (Pn) from Stacked PVG to 0 (step S201).

Then, the data management unit 141 deletes the logical volume 31 specified by the host 2 from the physical volume 22 (step S202). The data management unit 141 notifies the volume management unit 112 of information on the deleted logical volume 31 and information on the physical volume 22 that stored the deleted logical volume 31.

The volume management unit 112 receives the notice from the data migration processing unit 104 and determines whether or not there is a physical volume 22 having no valid logical volume 31 (step S203). If there is no physical volume having no valid logical volume 31 (step S203: negative), the volume management unit 112 proceeds to step S205.

On the one hand, if there is a physical volume 22 having no valid logical volume 31 (step S203: positive), the volume management unit 112 moves the physical volume 22 having no valid logical volume 31 to Scratch PVG 220 (step S204).

Then, the volume management unit 112 updates the number of physical volumes and the number of valid logical volumes in Stacked PVG, and the ratio of the valid logical volumes in the PVG management table 121 and the PV management table 122 (step S205).

Figure 21:
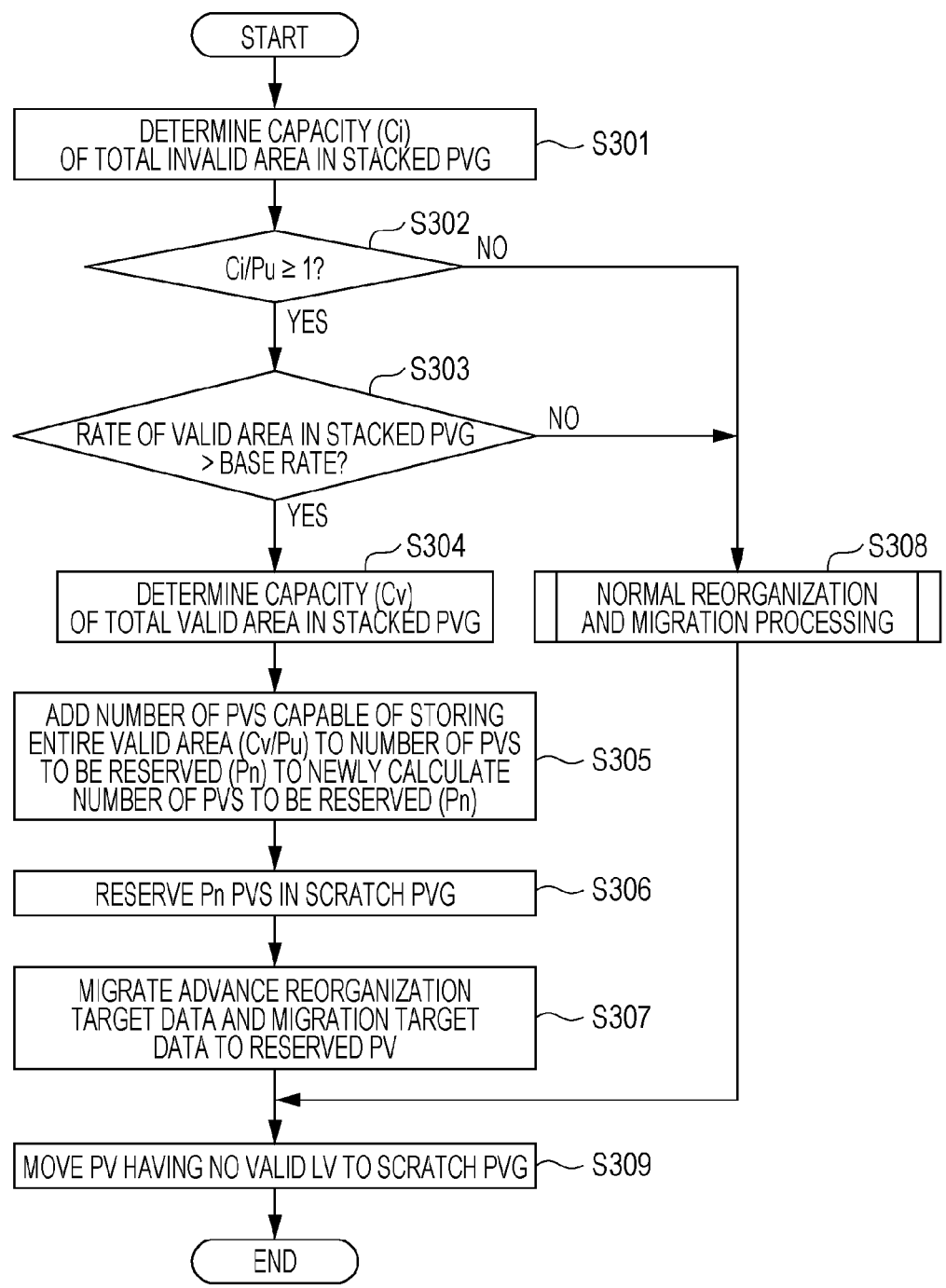
FIG. 21 is a flow chart of an advance reorganization process by the virtual tape library according to the embodiment.

Next, flow of advance reorganization by the virtual tape library 1 according to this example is described below with reference to FIG. 21. FIG. 21 is a flow chart of an advance reorganization process by the virtual tape library according to the embodiment. The process illustrated in the flow of FIG. 21 is performed after the process of FIG. 19 or FIG. 20 is performed.

The reorganization processing unit 142 determines the capacity of total invalid areas (Ci) in the Stacked PVG 210 (step S301).

Then, the reorganization processing unit 142 determines whether or not a result of division of the capacity of the total invalid areas (Ci) by the capacity per one physical volume 22 (Pu) is equal to or more than 1 (step S302).

When the division result is equal to or more than 1 (step S302: positive), the reorganization processing unit 142 acquires from the PV management table 122 the ratio of the valid logical volumes 31 in each of the physical volumes 22 to determine the ratio of the valid areas in the Stacked PVG. Then, the reorganization processing unit 142 determines whether or not the determined ratio of the valid areas in the Stacked PVG is equal to or more than the base rate of the valid logical volumes 31 registered in the PVG management table 121 (step S303).

When the ratio of the valid areas in the Stacked PVG is equal to more than the base rate of the valid logical volumes 31 (step S303: positive), the reorganization processing unit 142 determines the capacity of the total valid area (Cv) in the Stacked PVG (step S304).

Then, the reorganization processing unit 142 divides the capacity of the total valid area (Cv) by the capacity per one physical volume 22 (Pu) to calculate the number of physical volumes 22 for storing data of the capacity of the total valid area (Cv). Then, the reorganization processing unit 142 adds the number of the physical volumes 22 for storing the data of the capacity of the total valid area (Cv) to the number of physical volumes 22 to be reserved (Pn) which is already calculated. With this, the reorganization processing unit 142 newly calculates the number of physical volumes 22 to be reserved (Pn) (step S305).

Then, the reorganization processing unit 142 notifies the volume management unit 112 of the calculated number of the physical volumes 22 to be reserved (Pn). Upon receipt of the notice, the volume management unit 112 reserves the Pn physical volumes 22 from the Scratch PVG (step S306).

The reorganization processing unit 142 migrates advance reorganization target data and migration target data to the reserved physical volumes 22 (step S307). However, when migration is not executed, the reorganization processing unit 142 does not migrate the migration target data.

In contrast to this, when the division result is less than 1 (step S302: negative), or when the ratio of valid areas in the Stacked PVG is less than the base rate of the valid logical volumes 31 (step S303: negative), the reorganization processing unit 142 proceeds to step S308. Specifically, the reorganization processing unit 142 performs normal reorganization process and migration (step S308). A normal reorganization process and migration are described below with reference to FIG. 22.

Then, the reorganization processing unit 142 notifies the volume management unit 112 of information on the migrated logical volumes 31, information on the physical volumes 22 at the migration source, and information on the physical volumes 22 at the migration destination. Upon receipt of the notice, the volume management unit 112 updates the PV management table 122. The volume management unit further moves the physical volumes 22 having no valid logical volumes 31 to the Scratch PVG (step S309).

Figure 22:
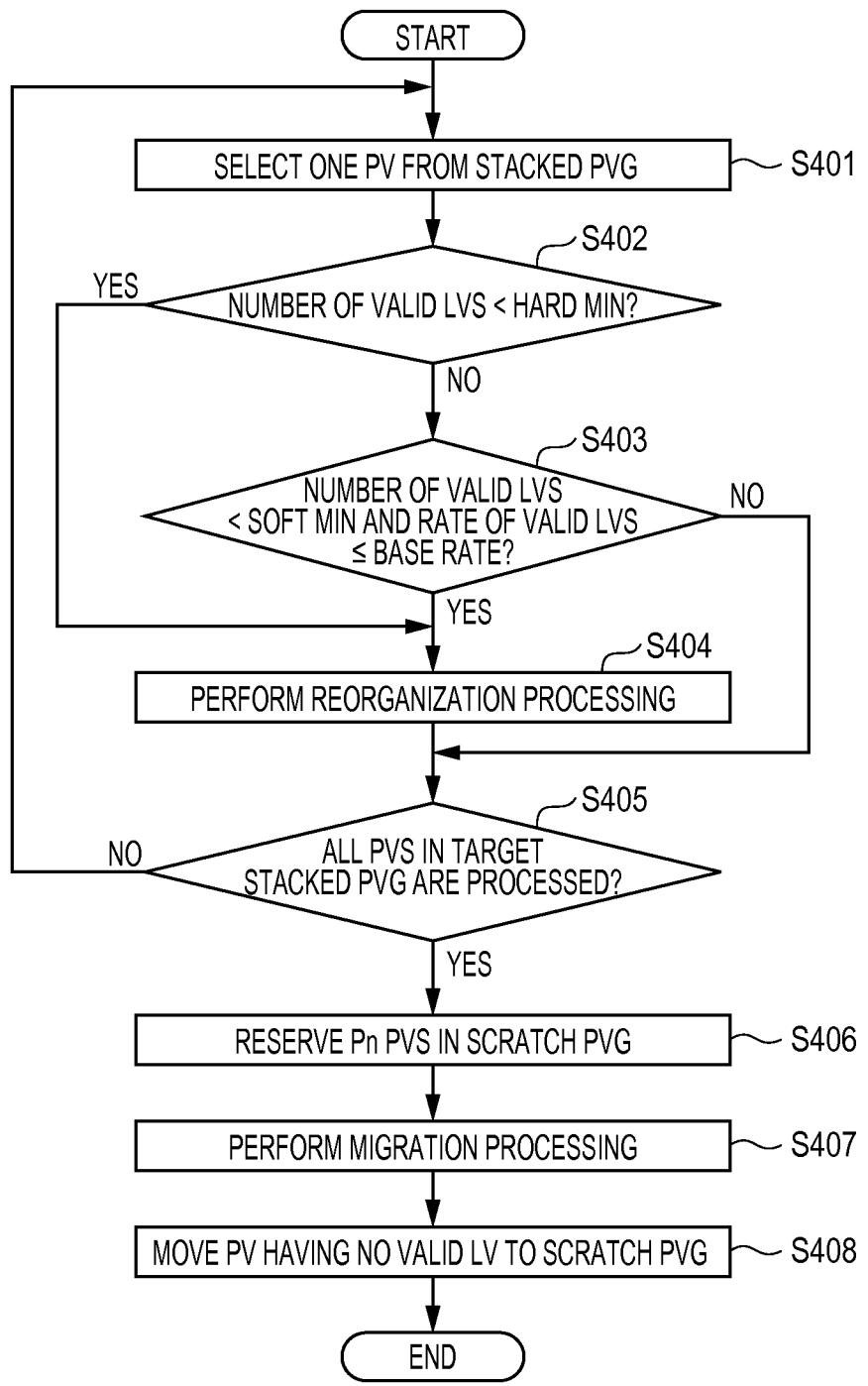
FIG. 22 is a flow chart of normal reorganization and migration processes by the virtual tape library according to the embodiment.

Next, flow of normal reorganization and migration by the virtual tape library 1 according to the example is described below with reference to FIG. 22. FIG. 22 is a flow chart of normal reorganization and migration processes by the virtual tape library according to the embodiment. This corresponds to one example of the process to be performed in step S308 in FIG. 21. Here, a description is given with a case in which Soft Minimum and Hard Minimum are used as determination on execution of reorganization.

The reorganization processing unit 142 selects one physical volume 22 from the Stacked PVG (step S401).

Then, the reorganization processing unit 142 acquires the number of valid logical volumes in the selected physical volume 22 from the PV management table 122. The reorganization processing unit 142 further acquires Hard Minimum, Soft Minimum and the base rate of the valid logical volumes 31 of the Stacked PVG 210 from the PVG management table 121. Then, the reorganization processing unit 142 determines whether or not the number of the valid logical volumes 31 in the selected physical volumes 22 is less than Hard Minimum (HARD MIN) (step S402). When the number of the valid logical volumes 31 in the selected physical volumes 22 is less than Hard Minimum (step S402: positive), the reorganization processing unit 142 proceeds to step S404.

In contrast to this, when the number of the valid logical volumes 31 in the selected physical volumes 22 is equal to or more than Hard Minimum (step S401: negative), the reorganization processing unit 142 determines whether or not the number of the valid logical volumes 31 is less than Soft Minimum (SOFT MIN) and whether or not the ratio is equal to or lower than the base rate (step S403). When the number of valid logical volumes 31 is equal to or more than Soft Minimum or when the ratio is higher than the base rate (step S403: negative), the reorganization processing unit 142 proceeds to step S405.

In contrast to this, when the number of the valid logical volumes 31 is less than Soft Minimum and when the ratio is equal to or lower than the base rate (step S403: positive), the reorganization processing unit 142 performs a reorganization process (step S404). Specifically, the reorganization processing unit 142 causes the volume management unit 112 to reserve physical volumes 22 in the Scratch PVG 220, and migrates the valid logical volumes 31 in the selected physical volumes 22 to the reserved physical volume 22.

Then, the reorganization processing unit 142 determines whether or not processing is done on all of the physical volumes 22 belonging to the target Stacked PVG 210 (step S405). If there remains any physical volume on which processing has not been done (step S405: negative), the reorganization processing unit 142 returns to step S401.

In contrast to this, when processing on all of the physical volumes 22 is complete (step S405: positive), the reorganization processing unit 142 instructs the data management unit 141 to perform the migration process. The data management unit 141 notifies the volume management unit 112 of an instruction to reserve the Pn physical volumes 22 in the Scratch PVG 220. Upon receipt of the notice, the volume management unit 112 reserves the Pn physical volumes 22 in the Scratch PVG 220 for the Stacked PVG 210 (step S406).

Then, the data management unit 141 executes migration (step S407).

Then, the volume management unit 112 acquires information on the migrated logical volumes 31, information on the physical volumes 22 at the migration destination, and information on the physical volumes 22 at the migration source from the data migration processing unit 104 and the reorganization processing unit 142. Then, the volume management unit 112 updates the PV management table 122 according to the acquired information. Then, the volume management unit 112 moves to the Scratch PVG 220 the physical volumes having no valid logical volumes 31 in the physical volumes 22 belonging to the Stacked PVG 210 (step S408).

Here, in the above, while the case in which a tape medium is used as a physical volume 22 is described, the physical volume 22 is not limited to this, and any other medium may be used as far as data is sequentially written in the medium and an invalid area is generated when data is updated. For example, the physical volume 22 may be an optical disk and a disk library may be used in place of the tape library device 20.

As described above, when the total capacity of invalid areas in one Stacked PVG is equal to or more than the capacity per one physical volume, the storage apparatus according to this example executes reorganization and puts one or more physical volume in unused status. More specifically, empty capacity may be reserved prior to timing of reorganization set by an administrator. With this, an unused volume may be generated and migrated to Scratch PVG, while physical volumes in Stacked PVG still have empty capacity. Thus, physical volumes that may be used by the Stacked PVG which shares that Scratch PVG may be increased. Thus, the storage apparatus according to this example may avoid depletion of unused physical volumes. For example, the storage apparatus according to this example may avoid depletion of unused physical volumes due to an error in estimates by an administrator or depletion of unused physical volumes due to concentrated usage of physical volumes by the Stacked PVG sharing the same Scratch PVG.

(Hardware Configuration)

Figure 23:
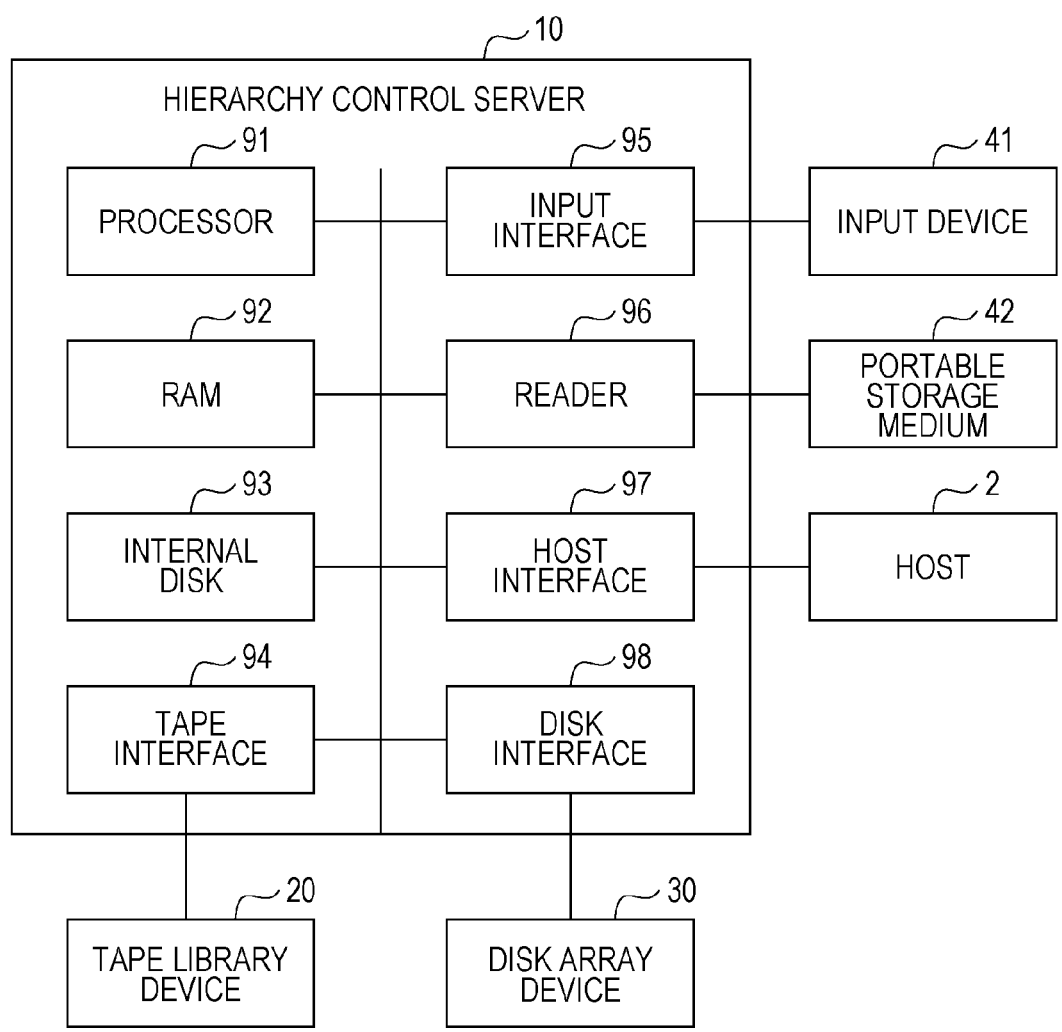
FIG. 23 is a hardware block diagram of a hierarchy control server.

A hardware configuration of the hierarchy control server 10 according to this example is described hereinafter with reference to FIG. 23. FIG. 23 is a hardware block diagram of a hierarchy control server.

The hierarchy control server 10 has a processor 91, a random access memory (RAM) 92, an internal disk 93, a tape interface 94, an input interface 95, a reader 96, a host interface 97, and a disk interface 98.

The RAM 92, the internal disk 93, the tape interface 94, the input interface 95, the reader 96, the host interface 97, and the disk interface 98 are connected to the processor 91 via a bus.

The input interface 95 is an interface configured to transmit and receive data to and from an input device 41, and the input interface 95 is connected.

Into the reader 96 is inserted a portable storage medium such as a compact disk (CD) or a digital versatile disk (DVD), and the reader 96 reads information of the inserted portable storage medium 42.

The disk interface 98 is an interface configured to transmit and receive data to and from the disk array device 30. To the disk interface 98 is connected the disk array device 30.

The tape interface 94 is an interface configured to transmit and receive data to and from the tape library device 20. To the tape interface 94 is connected the tape library device 20.

The internal disk 93 includes a hard disk or the like, and implements functions of the information storage unit 102 illustratively illustrated in FIG. 3, for example. For example, the PVG management table 121 and the PV management table 122 are stored in the internal disk 93. In addition, in the internal disk 93 are stored various programs including a program configured to implement functions of the group management unit 101, the read and write unit 103, the data migration processing unit 104, and the determination unit 105 illustratively illustrated in FIG. 3.

The processor 91 and the RAM 92 implement the functions of the group management unit 101, the read and write unit 103, the data migration processing unit 104, and the determination unit 105 illustratively illustrated in FIG. 3.

Specifically, the processor 91 reads various programs from the internal disk 93, and deploys and executes the programs on the RAM 92, thereby implementing the functions of the group management unit 101, the read and write unit 103, the data migration processing unit 104, and the determination unit 105.

In addition, here, while a description is given with a case in which the program configured to implement the functions of the group management unit 101, the read and write unit 103, the data migration processing unit 104, and the determination unit 105 is stored in the internal disk 93, a medium to store the program is not limited to the internal disk 93. For example, the reader 96 may read the portable storage medium 42 in which the program configured to implement the functions of the group management unit 101, the read and write unit 103, the data migration processing unit 104, and the determination unit 105 is stored, and the processor 91 and the RAM 92 may implement each function using the read program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage apparatus, comprising:
a plurality of storage media; and
a processor configured to
manage a first group including first storage media storing data among the plurality of storage media, and a second group including second storage media storing no data among the plurality of storage media,
make an area of the first storage media which stores update target data an invalid area, and store updated data into an area of the first storage media,
determine whether or not the first group includes a set of the first storage media in which a sum of invalid areas is equal to or larger than a capacity of one of the plurality of storage media,
migrate to the second storage media, data stored in an area other than the invalid areas of the set of the first storage media, when the processor determines that the first group includes the set of the first storage media in which the sum of the invalid areas is equal to or larger than the capacity of the one storage medium, and
move a group including the first storage media from which migration of the data is completed from the first group to the second group.

2. The storage apparatus according to claim 1, further comprising:
a storage device capable of reading and writing faster than the plurality of storage media, and
wherein the processor is configured to read and write data from and to the storage device, wherein the processor stores in the first storage media data stored into the storage device.

3. The storage apparatus according to claim 2, wherein the processor is configured to
store data acquired at a time as unit data in the storage apparatus, and
store the acquired data in the first storage media as the unit data.

4. The storage apparatus according to claim 1, wherein the processor is configured to,
when the first storage media in the first group include a migration target storage medium in which a ratio of data stored in an area other than the invalid area falls below a predetermined threshold,
move a group including the second storage media from the second group to the first group, and
perform a migration process to migrate to the second storage media the data stored in the area other than the invalid area in the migration target storage medium.

5. The storage apparatus according to claim 1, wherein, the processor is configured to, when the first storage media in the first group include a migration target storage medium in which a ratio of data stored in an area other than the invalid area falls below a predetermined threshold, move a group including the second storage media from the second group to the first group, and perform a migration process to migrate to the second storage media the data stored in the area other than the invalid area in the migration target storage medium, and determine whether the first group includes a set of the first storage media in which the sum of the invalid areas is equal to or larger than the capacity of the one storage medium after the migration process has been performed.

6. The storage apparatus according to claim 1, wherein the processor is configured to, when data stored in the first storage media is deleted, determine whether or not the first group includes a set of the first storage media in which the sum of the invalid areas is equal to or larger than the capacity of the one storage medium.

7. A storage apparatus control method, comprising:

grouping, by a processor, first storage media storing data among a plurality of storage media to form a first group;

grouping second storage media storing no data among the plurality of storage media to form a second group;

storing data in the first storage media;

making an area of the first storage media which stores updating target data an invalid area, and storing updated data of the data into an area of the first storage media;

determining whether or not the first group includes a set of the first storage media in which a sum of invalid areas is equal to or larger than a capacity of one of the plurality of storage media, when the first group includes the set of the first storage media in which the sum of the invalid areas is equal to or larger than the capacity of the one storage medium, migrating data stored in an area other than the invalid areas of the set of the first storage media to the second storage media; and moving a group including the first storage media from which migration of data is completed, from the first group to the second group.

* * * * *